United States Patent
Ma et al.

(10) Patent No.: US 11,902,002 B2
(45) Date of Patent: Feb. 13, 2024

(54) BEAM MEASUREMENT REPORTING

(71) Applicant: QUALCOMM Incorporated, San Diego, CA (US)

(72) Inventors: Liangping Ma, San Diego, CA (US); Bharat Shrestha, San Diego, CA (US); Xiao Feng Wang, San Diego, CA (US); Ayan Sengupta, San Diego, CA (US); Peter Gaal, San Diego, CA (US); Alberto Rico Alvarino, San Diego, CA (US); Umesh Phuyal, San Diego, CA (US); Jun Ma, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/388,430

(22) Filed: Jul. 29, 2021

(65) Prior Publication Data
US 2022/0038168 A1 Feb. 3, 2022

Related U.S. Application Data

(60) Provisional application No. 63/059,837, filed on Jul. 31, 2020.

(51) Int. Cl.
*H04B 7/08* (2006.01)
*H04W 24/10* (2009.01)
(Continued)

(52) U.S. Cl.
CPC ............ *H04B 7/088* (2013.01); *H04L 1/203* (2013.01); *H04W 24/08* (2013.01); *H04W 24/10* (2013.01);
(Continued)

(58) Field of Classification Search
CPC ........ H04B 7/088; H04L 1/203; H04W 24/08; H04W 24/10; H04W 72/1263; H04W 84/06
See application file for complete search history.

(56) References Cited

U.S. PATENT DOCUMENTS 11,197,183 B2 * 12/2021 Yang .................... H04W 24/10
2014/0334566 A1 * 11/2014 Kim ..................... H04B 7/0689
375/267
(Continued)

FOREIGN PATENT DOCUMENTS

CN 111818604 B * 7/2022 ............ H04W 36/06
WO WO-2019195060 A1 10/2019
(Continued)

OTHER PUBLICATIONS

3GPP TR 38.821: "3rd Generation Partnership Project, Technical Specification Group Radio Access Network, Solutions for NR to Support Non-Terrestrial Networks (NTN) (Release16)", 3GPP Standard, Technical Report, 3GPP TR 38.821, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), XP051860814, pp. 1-140, Retrieved from the Internet: URL: http://ftp.3gpp.org/Specs/archive/38_series/38.821/38821-g00.zip 38821-g00.doc [Retrieved on Jan. 16, 2020] Paragraphs [04.1], [6.3.4], [07.3], [09.2], Para. 7.3. 1.1-7.3. 1.2, 7.3.1.3.2, Para.8.1-8.2.2.2, p. 63, Paragraph 6.2.4 p. 82, Paragraph 7.2.1.2.1—p. 83, Paragraph 7.2.1.2.1, p. 89, Paragraph 7.3 -p. 93, Paragraph 7.3.1.7, Section 1, Section 5, Section: 7. 2. 1. 1, p. 38, Option 2, Section 6.2.3, Section 6.2.4.

(Continued)

*Primary Examiner* — Deepa Belur
(74) *Attorney, Agent, or Firm* — Holland & Hart LLP

(57) ABSTRACT

Methods, systems, and devices for wireless communications are described. In some networks, a user equipment (UE)

(Continued)

may switch between serving beams of a transmitting device that are associated with different bandwidth parts of a radio frequency spectrum. To improve aspects of beam measurement and selection, a UE may be configured to support various techniques for beam measurement according to the different bandwidth parts. For example, a UE may receive a beam measurement configuration associated with one or more beams, and may monitor for reference signals associated with the beams using the different bandwidth parts. The UE may determine a channel quality of one or more of the beams based on the monitoring, and transmit a beam measurement report to the network in accordance with the beam measurement configuration. In some examples, such a report may be transmitted based on the UE determining that an event condition is satisfied.

31 Claims, 15 Drawing Sheets

(51) Int. Cl.
*H04W 72/1263* (2023.01)
*H04L 1/20* (2006.01)
*H04W 24/08* (2009.01)
*H04W 84/06* (2009.01)

(52) U.S. Cl.
CPC ........ *H04W 72/1263* (2013.01); *H04W 84/06* (2013.01)

(56) References Cited

U.S. PATENT DOCUMENTS

| | | | | |
|---|---|---|---|---|
| 2016/0241322 | A1* | 8/2016 | Son | H04B 7/0417 |
| 2020/0036430 | A1* | 1/2020 | Kim | H04W 76/28 |
| 2020/0163071 | A1* | 5/2020 | Gao | H04W 72/046 |
| 2020/0343996 | A1* | 10/2020 | Yang | H04L 1/0026 |
| 2021/0021321 | A1* | 1/2021 | Liu | H04W 76/18 |
| 2021/0218457 | A1 | 7/2021 | Xu et al. | |
| 2022/0038168 | A1* | 2/2022 | Ma | H04B 7/1853 |
| 2022/0039077 | A1* | 2/2022 | Koskela | H04W 72/1268 |
| 2022/0303970 | A1* | 9/2022 | Son | H04B 7/0452 |
| 2022/0377625 | A1* | 11/2022 | Li | H04B 7/18541 |

FOREIGN PATENT DOCUMENTS

| | | | |
|---|---|---|---|
| WO | WO-2021168752 A1 | 9/2021 | |
| WO | WO-2021196236 A1 * | 10/2021 | |
| WO | WO-2022008945 A1 * | 1/2022 | |
| WO | WO-2022035643 A1 * | 2/2022 | H04L 5/0096 |

OTHER PUBLICATIONS

International Search Report and Written Opinion—PCT/US2021/044025—ISA/EPO—dated Dec. 1, 2021 (206450WO).
Qualcomm Incorporated: "Physical Layer Procedures for NTN", 3GPP Draft, 3GPP TSG RAN WG1 #99, R1-1912955, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019 Nov. 9, 2019 (Nov. 9, 2019), XP051823717, pp. 1-3, Retrieved from the Internet: URL: https://ftp.3gpp.org/tsg_ran/WG1_RL1/TSGR1_99/Docs/R1-1912955.zip R1-1912955 Physical Layer Procedures for NTN.docx [retrieved on Nov. 9, 2019] Section 3 Figure 1.

* cited by examiner

BEAM MEASUREMENT REPORTING

CROSS REFERENCE

The present Application for Patent claims the benefit of U.S. Provisional Patent Application No. 63/059,837 by Ma et al., entitled "BEAM MEASUREMENT REPORTING FOR A NON-TERRESTRIAL NETWORK," filed Jul. 31, 2020, assigned to the assignee hereof, and expressly incorporated by reference herein.

FIELD OF TECHNOLOGY

The following relates to wireless communications, including beam measurement reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may monitor reference signals to perform channel measurements, which may support evaluating channel quality. In some cases, when monitoring for reference signals using different communication resources, a UE may identify reduced channel quality.

SUMMARY

The described techniques relate to improved methods, systems, devices, and apparatuses that support beam measurement reporting, such as beam measurement reporting in which a beam transmitter may include a satellite or other non-terrestrial device. In some networks, different beams may be associated with different bandwidth parts (e.g., to reduce interference between adjacent beams), and a user equipment (UE) may perform beam switching that is accompanied by bandwidth part switching based on various network factors. In some techniques, a UE may be configured to transmit a status report to the network to report the quality of a cell (e.g., a serving cell) or cell pair (e.g., a serving cell and a neighboring cell), to reduce the likelihood of communication degradation for the UE. However, some techniques that are applied to cell measurement and switching may be associated with relatively high signaling overhead or power consumption, or may lack detail at a granularity of beams within a cell. Thus, to improve communications performance and reduce overhead, a UE may be configured by a network to support techniques for beam measurement reporting in accordance with examples disclosed herein.

In some examples, a UE may receive (e.g., from a network device) a beam measurement configuration associated with one or more beams, and each beam may be associated with a respective bandwidth part of a radio frequency spectrum according to a beam frequency mapping. The UE may monitor one or more reference signals in respective bandwidth parts according to the beam measurement configuration, and transmit a beam measurement report based on channel quality evaluations that are based on monitoring the reference signals. In some examples, the beam measurement configuration may include an indication of one or more event conditions, and the UE may transmit beam measurement reports based on determining that an event condition is satisfied (e.g., in a UE-initiated beam measurement reporting configuration). In some events, the UE may be prompted to generate a beam report based on a determination that one or more beams satisfy a threshold beam quality. In some events, the UE may be prompted to generate a beam report based on a comparison of quality between beams. In some events, the UE may be prompted to generate a beam report based on a block error rate associated with communications over a beam exceeding a threshold.

By configuring beam measurement reporting for beams that are each associated with a different bandwidth part, such as beams that may be employed by a network transmitter in a non-terrestrial network (NTN), a wireless communications system may support improved flexibility and responsiveness for maintaining a communication link using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by a UE, such that a UE may autonomously identify and generate a beam measurement report based on observing events associated with degrading beam quality, which may reduce power consumption or processing at a UE compared to other beam measurement techniques that do not involve UE-based measurement report initiation. These and other related improvements may be particularly beneficial in high mobility scenarios, such as an NTN, where movement of a transmitting device (e.g., a satellite), a receiving device (e.g., a UE), or both may involve relatively frequent reselection of beams and corresponding bandwidth parts to maintain a communication link.

A method for wireless communications at a UE is described. The method may include receiving a beam measurement configuration associated with one or more beams, where each beam of the one or more beams is associated with a respective bandwidth part of one or more bandwidth parts of a radio frequency spectrum according to a beam frequency mapping, monitoring, based on the beam measurement configuration, a first reference signal in a first bandwidth part of the one or more bandwidth parts that is associated with a first beam of the one or more beams according to the beam frequency mapping, determining a channel quality of the first beam based on the monitoring of the first reference signal in the first bandwidth part, determining that an event condition is satisfied based on the determining the channel quality of the first beam and, and transmitting a beam measurement report based on the determining that the event condition is satisfied.

An apparatus for wireless communications at a UE is described. The apparatus may include a processor, memory coupled with the processor, and instructions stored in the memory. The instructions may be operable, when executed by the processor, to cause the apparatus to receive a beam measurement configuration associated with one or more beams, where each beam of the one or more beams is associated with a respective bandwidth part of one or more bandwidth parts of a radio frequency spectrum according to a beam frequency mapping, monitoring, base at least in part on the beam measurement configuration, a first reference signal in a first bandwidth part of the one or more bandwidth parts that is associated with a first beam of the one or more beams according to the beam frequency mapping, determine a channel quality of the first beam based on the monitoring of the first reference signal in the first bandwidth part, determine that an event condition is satisfied based on the determining the channel quality of the first beam and, and transmit a beam measurement report based on the determining that the event condition is satisfied.

Another apparatus for wireless communications at a UE is described. The apparatus may include means for receiving a beam measurement configuration associated with one or more beams, where each beam of the one or more beams is associated with a respective bandwidth part of one or more bandwidth parts of a radio frequency spectrum according to a beam frequency mapping, means for monitoring, based on the beam measurement configuration, a first reference signal in a first bandwidth part of the one or more bandwidth parts that is associated with a first beam of the one or more beams according to the beam frequency mapping, means for determining a channel quality of the first beam based on the monitoring of the first reference signal in the first bandwidth part, means for determining that an event condition is satisfied based on the determining the channel quality of the first beam and, and means for transmitting a beam measurement report based on the determining that the event condition is satisfied.

A non-transitory computer-readable medium storing code for wireless communications at a UE is described. The code may include instructions executable by a processor to receive a beam measurement configuration associated with one or more beams, where each beam of the one or more beams is associated with a respective bandwidth part of one or more bandwidth parts of a radio frequency spectrum according to a beam frequency mapping, monitoring, base at least in part on the beam measurement configuration, a first reference signal in a first bandwidth part of the one or more bandwidth parts that is associated with a first beam of the one or more beams according to the beam frequency mapping, determine a channel quality of the first beam based on the monitoring of the first reference signal in the first bandwidth part, determine that an event condition is satisfied based on the determining the channel quality of the first beam and, and transmit a beam measurement report based on the determining that the event condition is satisfied.

Some examples of the method, apparatuses, and non-transitory computer-readable medium described herein may include operations, features, means, or instructions for monitoring, based on the beam measurement configuration, a second reference signal in a second bandwidth part of the one or more bandwidth parts that is associated with a second beam of the one or more beams according to the beam frequency mapping and determining a channel quality of the second beam based on the monitoring the second reference signal, where the determining that the event condition is satisfied may be based on the determining the channel quality of the second beam.

In some examples of the method, apparatuses, and non-transitory computer-readable medium described herein, the determining that the event condition is satisfied may include operations, features, means, or instructions for determining that a respective channel quality of each beam of a plurality of beams neighboring the first beam, including the second beam and included in the one or more beams, is greater than the channel quality of the first beam by at least a threshold amount.

Some examples of the method, apparatuses, and non-transitory computer-readable medium described herein may further include operations, features, means, or instructions for receiving a configuration to monitor a set of beams neighboring the first beam, the set of beams neighboring the first beam included in the one or more beams, monitoring, based on the configuration to monitor the set of beams neighboring the first beam, a respective reference signal in a respective bandwidth part that is associated with each beam of the set of beams neighboring the first beam according to the beam frequency mapping, and determining, based on monitoring the respective reference signals, a respective channel quality of each beam of the set of beams, where the determining that the respective channel quality of each beam of the set of beams neighboring the first beam is greater than the channel quality of the first beam by at least the threshold amount includes determining that the channel quality of two or more beams of the set of beams neighboring the first beam is greater than the channel quality of the first beam by at least the threshold amount.

In some examples of the method, apparatuses, and non-transitory computer-readable medium described herein, the determining that the event condition is satisfied may include operations, features, means, or instructions for determining that the channel quality of the second beam is greater than the channel quality of the first beam by at least a threshold amount.

In some examples of the method, apparatuses, and non-transitory computer-readable medium described herein, the determining that the event condition is satisfied may include operations, features, means, or instructions for determining that the channel quality of the second beam is greater than a threshold channel quality.

In some examples of the method, apparatuses, and non-transitory computer-readable medium described herein, the determining that the event condition is satisfied may include operations, features, means, or instructions for determining that the channel quality of the first beam is less than a first threshold channel quality and determining that the channel quality of the second beam is greater than a second threshold channel quality.

Some examples of the method, apparatuses, and non-transitory computer-readable medium described herein may further include operations, features, means, or instructions for determining that the channel quality of the first beam satisfies a threshold channel quality, where the monitoring the second reference signal may be based on the channel quality of the first beam satisfying the threshold channel quality.

Some examples of the method, apparatuses, and non-transitory computer-readable medium described herein may further include operations, features, means, or instructions for determining the threshold channel quality based on receiving the beam measurement configuration, the threshold channel quality including a threshold reference signal received power (RSRP), a threshold reference signal received quality (RSRQ), a threshold signal to interference and noise ratio (SINR), or a combination thereof.

Some examples of the method, apparatuses, and non-transitory computer-readable medium described herein may further include operations, features, means, or instructions for determining a block error rate (BLER) associated with communications using the first beam, where the determining that the event condition is satisfied includes determining that the BLER associated with the communications using the first beam is greater than a threshold BLER.

In some examples of the method, apparatuses, and non-transitory computer-readable medium described herein, the threshold BLER may be lower than a BLER threshold associated with determining a radio link failure.

In some examples of the method, apparatuses, and non-transitory computer-readable medium described herein, determining that the event condition is satisfied may include operations, features, means, or instructions for determining that the channel quality of the first beam is greater than a threshold channel quality.

In some examples of the method, apparatuses, and non-transitory computer-readable medium described herein, determining that the event condition is satisfied may include operations, features, means, or instructions for determining that the channel quality of the first beam is less than a threshold channel quality.

Some examples of the method, apparatuses, and non-transitory computer-readable medium described herein may further include operations, features, means, or instructions for transmitting an indication that the event condition is satisfied and receiving a grant of resources for the transmitting the beam measurement report.

In some examples of the method, apparatuses, and non-transitory computer-readable medium described herein, transmitting the beam measurement report may include operations, features, means, or instructions for transmitting a radio resource control message, a medium access control (MAC) control element (CE), or uplink control information that includes the beam measurement report.

Some examples of the method, apparatuses, and non-transitory computer-readable medium described herein may further include operations, features, means, or instructions for generating the MAC CE for the beam measurement report and transmitting a scheduling request, based on the generating the MAC CE, for requesting a transmission resource for transmitting the MAC CE, or for a retransmission of the MAC CE.

In some examples of the method, apparatuses, and non-transitory computer-readable medium described herein, the beam measurement report includes a bitmap reporting whether each beam of a set of beams satisfies one or more event conditions.

In some examples of the method, apparatuses, and non-transitory computer-readable medium described herein, receiving the beam measurement configuration may include operations, features, means, or instructions for receiving an indication of a set of event conditions for beam measurement reporting, or a set of signal quality measurements for beam measurement reporting, or a combination thereof.

Some examples of the method, apparatuses, and non-transitory computer-readable medium described herein may further include operations, features, means, or instructions for determining a channel quality threshold based on receiving the beam measurement configuration, the channel quality threshold including a threshold RSRP, a threshold RSRQ, a threshold SINR, or a combination thereof and determining that the event condition is satisfied based on determining the channel quality threshold.

In some examples of the method, apparatuses, and non-transitory computer-readable medium described herein, receiving the beam measurement configuration may include operations, features, means, or instructions for receiving a first indication of a radio resource management configuration and receiving a second indication indicating that the radio resource management configuration is to be applied for measuring the one or more beams.

Some examples of the method, apparatuses, and non-transitory computer-readable medium described herein may further include operations, features, means, or instructions for determining to include one or more channel quality indications in the beam measurement report based on a size of a communications resource available for transmitting the beam measurement report.

In some examples of the method, apparatuses, and non-transitory computer-readable medium described herein, the one or more beams may be associated with a node of an NTN.

A method for wireless communications at a network device is described. The method may include transmitting a beam measurement configuration associated with one or more beams of the network device, where each beam of the one or more beams is associated with a respective bandwidth part of one or more bandwidth parts of a radio frequency spectrum according to a beam frequency mapping, transmitting reference signals using the one or more beams, where the transmitting the reference signals includes transmitting, for each beam of the one or more beams, a respective reference signal using the respective bandwidth part associated with the beam according to the beam frequency mapping, and receiving, from a UE based on transmitting the reference signals using the one or more beams, a beam measurement report based on the beam measurement configuration.

An apparatus for wireless communications at a network device is described. The apparatus may include a processor, memory coupled with the processor, and instructions stored in the memory. The instructions may be operable, when executed by the processor, to cause the apparatus to transmit a beam measurement configuration associated with one or more beams of the network device, where each beam of the one or more beams is associated with a respective bandwidth part of one or more bandwidth parts of a radio frequency spectrum according to a beam frequency mapping, transmit reference signals using the one or more beams, where the transmitting the reference signals includes transmitting, for each beam of the one or more beams, a respective reference signal using the respective bandwidth part associated with the beam according to the beam frequency mapping, and receive, from a UE based on transmitting the reference signals using the one or more beams, a beam measurement report based on the beam measurement configuration.

Another apparatus for wireless communications at a network device is described. The apparatus may include means for transmitting a beam measurement configuration associated with one or more beams of the network device, where each beam of the one or more beams is associated with a respective bandwidth part of one or more bandwidth parts of a radio frequency spectrum according to a beam frequency mapping, means for transmitting reference signals using the one or more beams, where the transmitting the reference signals includes transmitting, for each beam of the one or more beams, a respective reference signal using the respective bandwidth part associated with the beam according to the beam frequency mapping, and means for receiving, from a UE based on transmitting the reference signals using the one or more beams, a beam measurement report based on the beam measurement configuration.

A non-transitory computer-readable medium storing code for wireless communications at a network device is described. The code may include instructions executable by a processor to transmit a beam measurement configuration associated with one or more beams of the network device, where each beam of the one or more beams is associated with a respective bandwidth part of one or more bandwidth parts of a radio frequency spectrum according to a beam frequency mapping, transmit reference signals using the one or more beams, where the transmitting the reference signals includes transmitting, for each beam of the one or more beams, a respective reference signal using the respective bandwidth part associated with the beam according to the beam frequency mapping, and receive, from a UE based on transmitting the reference signals using the one or more beams, a beam measurement report based on the beam measurement configuration.

In some examples of the method, apparatuses, and non-transitory computer-readable medium described herein, the beam measurement configuration indicates an event condition for initiating beam measurement reporting by the UE.

In some examples of the method, apparatuses, and non-transitory computer-readable medium described herein, the transmitting the beam measurement configuration may include operations, features, means, or instructions for transmitting an indication for the UE to transmit the beam measurement report based on a respective channel quality of a plurality of beams being greater than a channel quality of a reference beam by at least a threshold amount.

Some examples of the method, apparatuses, and non-transitory computer-readable medium described herein may further include operations, features, means, or instructions for transmitting a configuration for the UE to monitor a set of beams neighboring the reference beam, the set of beams including the plurality of beams.

In some examples of the method, apparatuses, and non-transitory computer-readable medium described herein, the transmitting the beam measurement configuration may include operations, features, means, or instructions for transmitting an indication for the UE to transmit the beam measurement report based on a channel quality of a second beam being greater than a channel quality of a reference beam by at least a threshold amount.

In some examples of the method, apparatuses, and non-transitory computer-readable medium described herein, the transmitting the beam measurement configuration may include operations, features, means, or instructions for transmitting an indication for the UE to transmit the beam measurement report based on a channel quality of a second beam, different than a reference beam, being greater than a threshold channel quality.

In some examples of the method, apparatuses, and non-transitory computer-readable medium described herein, the transmitting the beam measurement configuration may include operations, features, means, or instructions for transmitting an indication for the UE to transmit the beam measurement report based on a channel quality of a first beam being less than a first threshold channel quality, and based on a channel quality of a second beam being greater than a second threshold channel quality.

In some examples of the method, apparatuses, and non-transitory computer-readable medium described herein, the transmitting the beam measurement configuration may include operations, features, means, or instructions for transmitting an indication for the UE to monitor a second reference signal associated with a second beam based on a channel quality of a first beam satisfying a threshold channel quality.

In some examples of the method, apparatuses, and non-transitory computer-readable medium described herein, the threshold channel quality includes a threshold RSRP, a threshold RSRQ, a threshold SINR, or a combination thereof.

In some examples of the method, apparatuses, and non-transitory computer-readable medium described herein, the transmitting the beam measurement configuration may include operations, features, means, or instructions for transmitting an indication for the UE to transmit the beam measurement report based on a BLER associated with communications using a beam being greater than a threshold BLER.

In some examples of the method, apparatuses, and non-transitory computer-readable medium described herein, the threshold BLER may be lower than a BLER threshold associated with determining a radio link failure.

In some examples of the method, apparatuses, and non-transitory computer-readable medium described herein, the transmitting the beam measurement configuration may include operations, features, means, or instructions for transmitting an indication for the UE to transmit the beam measurement report based on a channel quality of a reference beam being greater than a threshold channel quality.

In some examples of the method, apparatuses, and non-transitory computer-readable medium described herein, the transmitting the beam measurement configuration may include operations, features, means, or instructions for transmitting an indication for the UE to transmit the beam measurement report based on a channel quality of a reference beam being less than a threshold channel quality.

Some examples of the method, apparatuses, and non-transitory computer-readable medium described herein may further include operations, features, means, or instructions for receiving, from the UE, an indication that the event condition is satisfied and transmitting, based on receiving the indication that the event condition is satisfied, a grant of resources for the UE to use for the transmitting the beam measurement report.

In some examples of the method, apparatuses, and non-transitory computer-readable medium described herein, the transmitting the beam measurement configuration may include operations, features, means, or instructions for transmitting an indication of a set of event conditions for beam measurement reporting, or a set of signal quality measurements for beam measurement reporting, or a combination thereof.

In some examples of the method, apparatuses, and non-transitory computer-readable medium described herein, the transmitting the beam measurement configuration may include operations, features, means, or instructions for transmitting an indication of a threshold channel quality associated with determining that the event condition is satisfied, the threshold channel quality including a threshold RSRP, a threshold RSRQ, a threshold SINR, or a combination thereof.

In some examples of the method, apparatuses, and non-transitory computer-readable medium described herein, the transmitting the beam measurement configuration may include operations, features, means, or instructions for transmitting a first indication of a radio resource management configuration and transmitting a second indication indicating that the radio resource management configuration is to be applied for measuring the one or more beams each associated with the respective bandwidth part.

In some examples of the method, apparatuses, and non-transitory computer-readable medium described herein, the network device may be a node of an NTN.

DETAILED DESCRIPTION

Figure 1:
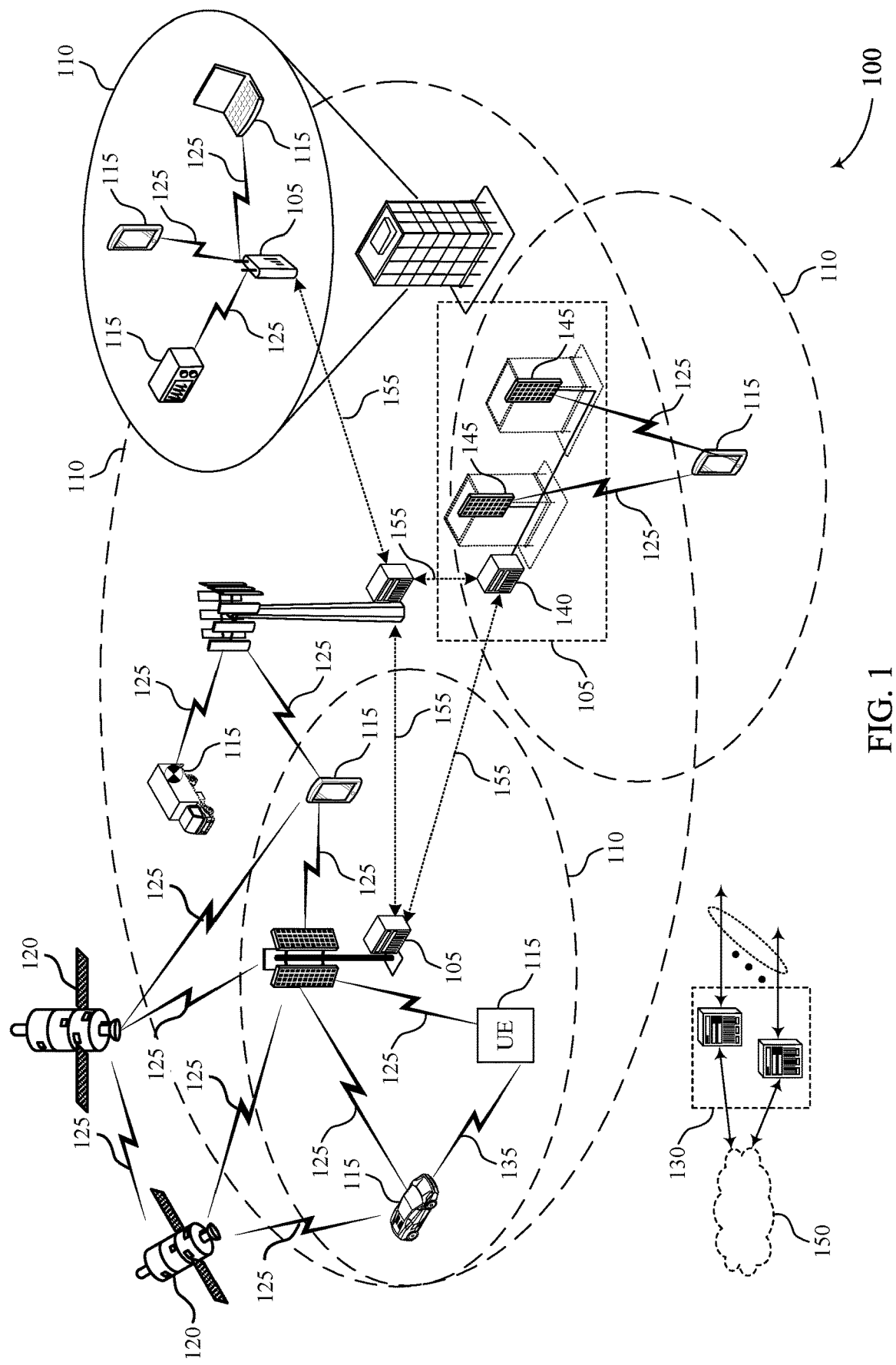
FIG. 1 illustrates an example of a wireless communications system that supports beam measurement reporting in accordance with aspects of the present disclosure.

The described techniques relate to improved methods, systems, devices, and apparatuses that support beam measurement reporting, such as beam measurement reporting in which a beam transmitter may include a satellite or other non-terrestrial device. In some networks, different beams may be associated with different bandwidth parts (e.g., to reduce interference between adjacent beams), and a user equipment (UE) may perform beam switching that is accompanied by bandwidth part switching based on various network factors. In some techniques, a UE may be configured to transmit a status report to the network to report the quality of a cell (e.g., a serving cell) or cell pair (e.g., a serving cell and a neighboring cell), to reduce the likelihood of communication degradation for the UE. However, some techniques that are applied to cell measurement and switching may be associated with relatively high signaling overhead or power consumption, or may lack detail at a granularity of beams within a cell. Thus, to improve communications performance and reduce overhead, a UE may be configured by a network to support techniques for beam measurement reporting in accordance with examples disclosed herein.

In some examples, a UE may receive (e.g., from a network device) a beam measurement configuration associated with one or more beams, and each beam may be associated with a respective bandwidth part of a radio frequency spectrum according to a beam frequency mapping. The UE may monitor one or more reference signals in respective bandwidth parts according to the beam measurement configuration, and may transmit a beam measurement report based on channel quality evaluations that are based on monitoring the reference signals. In some examples, the beam measurement configuration may include an indication of one or more event conditions, and the UE may transmit beam measurement reports based on determining that an event condition is satisfied (e.g., in a UE-initiated beam measurement reporting configuration). In some events, the UE may be prompted to generate a beam report based on a determination that one or more beams satisfy a threshold beam quality. In some events, the UE may be prompted to generate a beam report based on a comparison of quality between beams. In some events, the UE may be prompted to generate a beam report based on a block error rate (BLER) associated with communications over a beam exceeding a threshold.

By configuring beam measurement reporting for beams that are each associated with a different bandwidth part, such as beams that may be employed by a network transmitter in a non-terrestrial network (NTN), a wireless communications system may support improved flexibility and responsiveness for maintaining a communication link using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by a UE, where a UE may autonomously identify and generate a beam measurement report based on observing events associated with degrading beam quality, which may reduce power consumption or processing at a UE compared to other beam measurement techniques that do not involve UE-based measurement report initiation. These and other related improvements may be particularly beneficial in high mobility scenarios, such as an NTN, where movement of a transmitting device (e.g., a satellite), a receiving device (e.g., a UE), or both may involve relatively frequent reselection of beams and corresponding bandwidth parts to maintain a communication link.

Aspects of the disclosure are initially described in the context of wireless communications systems and associated signaling and operations. Aspects of the disclosure are further illustrated by and described with reference to apparatus diagrams, system diagrams, and flowcharts that relate to beam measurement reporting.

FIG. 1 illustrates an example of a wireless communications system 100 that supports beam measurement reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120 (e.g., in an NTN configuration), which may communicate with base stations 105 or the core network 130 via gateways (e.g., ground-based terminals, NTN gateways). Satellites 120 may also communicate with UEs 115, which may include other high altitude or terrestrial communications devices. In various examples, a satellite 120 itself may be an example of a base station 105 (e.g., supporting a gNB processed payload), or a satellite 120 may provide a relay of signals between a base station 105 and UEs 115 (e.g., in a transparent satellite configuration, where a satellite 120 and a gateway may be configured together as a remote radio unit). A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of an NTN. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration, but may also use on-board processing to perform other functions. Examples of these other functions may include demodulating a received signal, decoding a received signal, re-encoding a signal to be transmitted, or modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

In accordance with examples as disclosed herein, the wireless communications system 100 may be configured to provide (e.g., via a base station 105, via a satellite 120) a beam measurement configuration to a UE 115 that indicates parameters for monitoring reference signals of transmission beams (e.g., different beams of a transmitting device) that are each associated with a respective bandwidth part. The UE 115 may monitor one or more reference signals in respective bandwidth parts according to the beam measurement configuration, and transmit (e.g., to a base station 105, to a satellite 120, to the network) a beam measurement report based on channel quality evaluations that are based on monitoring the reference signals. In some examples, the beam measurement configuration may include an indication of one or more event conditions, and the UE 115 may transmit beam measurement reports based on determining that an event condition is satisfied (e.g., in a UE-initiated beam measurement reporting configuration). In some events, the UE 115 may be prompted to generate a beam report based on a determination that one or more beams satisfy a threshold beam quality. In some events, the UE 115 may be prompted to generate a beam report based on a comparison of quality between beams. In some events, the UE 115 may be prompted to generate a beam report based on a block error rate associated with communications over a beam exceeding a threshold.

By configuring beam measurement reporting for beams that are each associated with a different bandwidth part, such as beams that may be employed by a network transmitter in an NTN, the wireless communications system 100 may support improved flexibility and responsiveness for maintaining a communication link using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by a UE 115, where the UE 115 may autonomously identify and generate a beam measurement report based on observing events associated with degrading beam quality, which may reduce power consumption or processing at the UE 115 compared to other beam measurement techniques that do not involve UE-based measurement report initiation. These and other related improvements may be particularly beneficial in high mobility scenarios, such as in an NTN, where movement of a transmitting device (e.g., a satellite 120), a receiving device (e.g., a UE 115), or both may involve relatively frequent reselection of beams and corresponding bandwidth parts to maintain a communication link.

Figure 2:
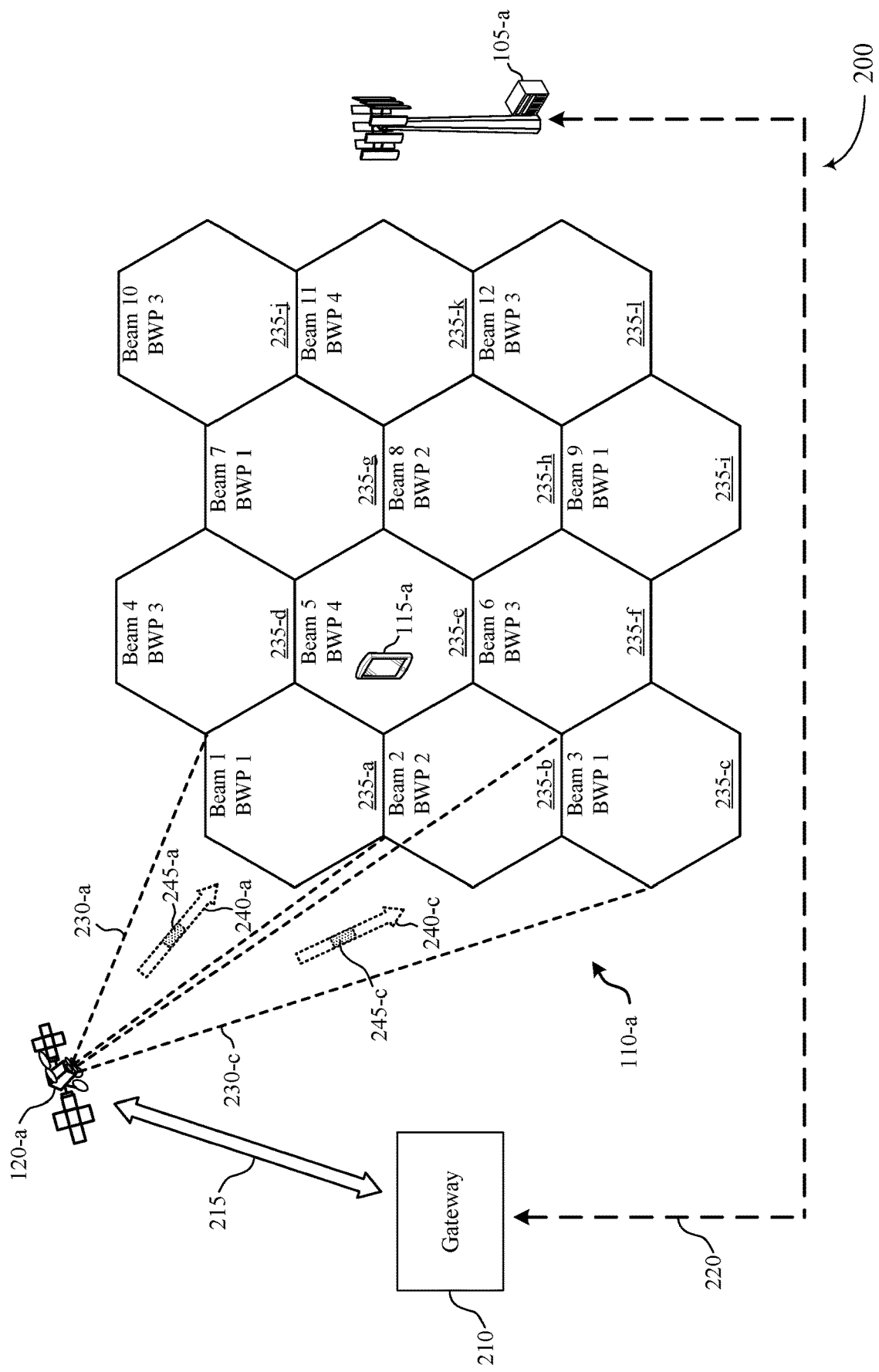
FIG. 2 illustrates an example of a wireless communications system that supports beam measurement reporting in accordance with aspects of the present disclosure.

FIG. 2 illustrates an example of a wireless communications system 200 that supports beam measurement reporting for NTNs in accordance with aspects of the present disclosure. In some examples, the wireless communications system 200 may implement aspects of the wireless communications system 100. For example, wireless communications system 200 may include a UE 115-a and a satellite 120-a. In some examples, the wireless communications system 200 may also include a gateway 210, or a base station 105-a, or both. In various examples, one or more of the satellite 120-a, the gateway 210, or base station 105-a, or various combinations thereof, may be connected with a network, such as a core network 130 described with reference to FIG. 1.

The satellite 120-a may be configured to support communications over a geographic coverage area 110-a. The geographic coverage area 110-a may be located at a relatively fixed location (e.g., when the satellite 120-a is in a geostationary orbit or otherwise generally fixed overhead location), or may move or sweep across locations (e.g., as a moving geographic coverage area, such as when the satellite 120-a is in a low-earth orbit or medium earth orbit, or is otherwise moving overhead).

In some examples, the satellite 120-a may be an example of, or configured to operate as, a smart satellite, where the satellite 120-*a* supports a capability for processing communications associated with the coverage area 110-*a* (e.g., uplink communications, downlink communications, or both). In examples where the satellite 120-*a* is configured to operate as a smart satellite, the satellite 120-*a* may be an example of a base station 105 as described herein (e.g., where the satellite 120-*a* operates as a gNB or other type of base station), and the satellite 120-*a* may or may not communicate with a core network 130 via the gateway 210 (e.g., over a gateway communication link 215).

In some examples, the satellite 120-*a* may be an example of, or configured to operate as, a bent-pipe transponder or a regenerative transponder, where the satellite 120-*a* may operate as a relay between the gateway 210 and one or more devices within the geographic coverage area 110-*a* (e.g., relaying signals received from the geographic coverage area 110-*a* over a gateway communication link 215, relaying signals received from the gateway 210 over a gateway communication link 215 as transmissions to devices in the geographic coverage area 110-*a*). In examples where the satellite 120-*a* is configured to operate as a bent-pipe or regenerative transponder, the gateway 210, or the combination of the gateway 210 and the satellite 120-*a*, may be an example of a base station 105 as described herein (e.g., where the gateway 210 operates as a gNB or other type of base station, where the combination of the satellite 120-*a* and the gateway 210 operates as a gNB or other type of base station). In some examples, the gateway 210 may communicate with a base station 105 (e.g., base station 105-*a*, via a communication link 220), and the combination of the gateway 210 and the satellite 120-*a* may be configured together as a remote radio unit of the base station 105. In some examples, the gateway 210 itself may be configured to operate as a base station 105 (e.g., in a base station entity included in or otherwise co-located with the gateway 210).

The satellite 120-*a* may be configured to support communications using a plurality of transmission or reception beams, which may refer to spatial or directional communication resources formed by or otherwise supported by an antenna array of the satellite 120-*a* according to various beamforming techniques. For example, the satellite 120-*a* may be configured to support a plurality of beams 230, which may refer to downlink beams (e.g., downlink transmission beams) that support downlink communications 240 over the geographic coverage area 110-*a*. Each beam 230 may be associated with a corresponding beam coverage area 235 (e.g., beam coverage area 235-*a* corresponding to beam 230-*a*, and so on), and a plurality of beams 230 or beam coverage areas 235 (e.g., beam coverage areas 235-*a* through 235-*1*) may be distributed across the geographic coverage area 110-*a*. In some examples, beams 230 may support both downlink and uplink communications. In some examples, a first set of beams 230 (e.g., transmission beams) may support downlink communications and a second set of beams 230 (e.g., reception beams, beams of a different antenna array, beams associated with different directions or different beam coverage areas 235) may support uplink communications. In various examples, each of the beams 230 may be configured to operate as a different cell, or one or more cells may be configured according to sets of two or more beams 230, or all of the beams 230 may be configured to operate as a single cell.

Although the beam coverage areas 235 are shown as nested hexagonal areas for illustrative purposes, beams 230 may have some degree of overlap. For example, transmitted signal energy from one beam 230 may be incident on one or more beam coverage areas 235 that are adjacent to the beam coverage area 235 corresponding to the transmitting beam 230 (e.g., transmissions of a beam 230 associated with the beam coverage area 235-*e* may be incident on one or more of beam coverage areas 235-*a*, 235-*b*, 235-*d*, 235-*f*, 235-*g*, or 235-*h*, and transmissions of beams 230 associated beam coverage areas 235-*a*, 235-*b*, 235-*d*, 235-*f*, 235-*g*, or 235-*h*, may be incident on the beam coverage area 235-*e* and so on). To reduce interference between adjacent or neighboring beams 230, each of the beams 230 may be configured with a respective bandwidth part such that adjacent beams 230 are configured for communication over different bandwidth parts. In one example, such frequency separation may be provided by a pattern of four bandwidth parts, each spanning a different range of a radio frequency spectrum (e.g., Beams 1, 3, 7, and 9 being associated with a BWP 1, Beams 2 and 8 being associated with a BWP 2, Beams 4, 6, 10, and 12 being associated with a BWP 3, and Beams 5 and 11 being associated with a BWP 4).

In some examples, the UE 115-*a* may establish a communication link with or via the satellite 120-*a* while the UE 115-*a* is located within the geographic coverage area 110-*a*. To maintain such a communication link, the UE 115-*a* may switch between beams 230 relatively frequently, due to mobility of the UE 115-*a* (e.g., where the UE 115-*a* moves from one beam coverage area 235 to another), mobility of the satellite 120-*a* (e.g., where the geographic coverage area 110-*a* or one or more beam coverage areas 235 move relative to the UE 115-*a*), or various combinations thereof. In some examples, to support such beam switching or selection, the UE 115-*a* may perform beam measurement operations to evaluate channel quality for communications via one or more beams 230. For example, the UE 115-*a* may monitor or measure reference signals 245 included in the downlink communications 240 for respective beams 230, which may include or be otherwise associated with a beam identifier carried in the downlink communications 240.

In an NTN, such as wireless communications system 200 supported by a transmitting satellite 120-*a*, the UE 115-*a* may perform beam switching relatively frequently, based on factors such as movement of satellite beam coverage areas 235 (e.g., 7 km/sec for some low-earth orbit (LEO) satellites), Doppler effects associated with the movement of the satellite 120-*a*, size of the beam coverage areas 235, (e.g., 70 kilometers by 300 kilometers, which may be relatively small in combination with the rate of movement of the beam coverage areas 235), or any combination thereof. In some examples, such beam switching may be performed more often or more quickly than cell handovers in a terrestrial network. Further, although for line-of-sight communications a beam footprint may be relatively predictable, in non-line-of-sight communications, which may be applicable to communications between the satellite 120-*a* and devices in the geographic coverage area 110-*a* (e.g., due to obstructions or reflecting features such as buildings, canyons, mountains, or other signal-blocking or signal-altering features), a beam footprint may be less predictable, such that beam measurement may become more important to evaluation of and switching between beams 230.

According to some techniques, a UE 115 may be configured to transmit a status report to the network to report the quality of a cell (e.g., a serving cell) or cell pair (e.g., a serving cell and a neighboring cell), to reduce the likelihood of communication degradation for the UE 115. For example, a UE 115 may be configured to perform measurement and reporting for various cells based on reference signals. In some such techniques, a UE 115 may periodically report a reference signal received power (RSRP) based on a channel state information reference signal (CSI-RS) or synchronization signal block (SSB). In various examples, such a report may be transmitted periodically, semi-persistently, or aperiodically. Additionally or alternatively, radio resource management (RRM) reporting may be performed based on one or more cell-level measurements. In some examples, such techniques may be triggered based on various events that indicate changes in the quality of a serving cell or one or more neighboring cells. However, such reporting at a cell level may include a consolidation of beam statistics, and therefore may not report statistics for individual beams 230. In examples where each of the beam coverage areas 235 is associated with a single cell, certain techniques for cell-level measurement may therefore not report changes of channel quality using different beams 230 in the same cell, and accordingly may not be suitable for certain aspects of networks such as NTNs.

In accordance with examples as disclosed herein, the wireless communications system 200 may be configured to support beam-level or beam-granularity measurement reporting by the UE 115-a, which may be applicable in such scenarios as an NTN where different beams 230 are associated with different bandwidth parts according to a beam frequency mapping. For example, the wireless communications system 200 may implement various aspects of a beam measurement configuration, which may configure channel status information (CSI) or other reference signal resources, beam measurement parameters, and beam reporting parameters for the UE 115-a, where such reporting may be periodic (e.g., as configured by RRC signaling), semi-persistent (e.g., as configured by RRC signaling and activated or deactivated by MAC signaling), aperiodic (e.g., network-initiated), or event-triggered (e.g., UE-initiated).

In some examples, a beam measurement configuration may include an indication of resources (e.g., CSI resources) on various beams 230 or bandwidth parts, such as frequency resources or timing occasions for monitoring CSI-RSs, SSBs, or other reference signals 245. In some examples, a beam measurement configuration may include a condition to start measuring candidate beams 230, such as configuring the UE 115-a to start to measure a candidate or neighboring beam 230 if the channel quality measurement on a current beam 230 (e.g., a beam used for or most-recently used for communications with the UE 115-a) is worse than (e.g., less than) a threshold. In some examples, a beam measurement configuration may include an indication of which of one or more event conditions the UE 115-a should use to initiate generating or transmitting a beam measurement report, parameters related to measurement such as which beams 230 to measure, or various parameters related to triggering conditions such as hysteresis, offsets, time-to-trigger, filtering coefficients, or any combination thereof. In some examples, a beam measurement configuration may include an indication of which measurements should be included in a beam measurement report, such as an RSRP, an reference signal received quality (RSRQ), a signal to interference and noise ratio (SINR), a SNR, or some other quantity or combination of quantities.

In the example of wireless communications system 200, the UE 115-a may perform various measurements and reporting according to such a received beam measurement configuration. To perform measurements on different beams 230, the UE 115-a may tune a radio of the UE 115-a to listen for or otherwise receive such reference signals 245. For example, to monitor reference signals of a beam 230 corresponding to the beam coverage area 235-e (e.g., a current beam, a beam used for communications between the satellite 120-a and the UE 115-a), a radio may be tuned to BWP 4. For the evaluation of channel quality of neighboring beams, to monitor reference signals of beams 230 associated with beam coverage areas 235-a or 235-g, a radio of the UE 115-a may be tuned to BWP 1, to monitor reference signals of beams 230 associated with beam coverage areas 235-b or 235-h, a radio of the UE 115-a may be tuned to BWP 2, and to monitor reference signals of beams 230 associated with beam coverage areas 235-d or 235-f, a radio of the UE 115-a may be tuned to BWP 3.

In some examples, the UE 115-a may transmit a channel quality report to or via the same device or system that transmits the beams 230 (e.g., the satellite 120-a), which may include a transmission to the satellite 120-a when the satellite 120-a serves as a base station 105 (e.g., in a gNB processed payload configuration), or a transmission via or through the satellite 120-a to the gateway 210 (over communication link 215), or to a base station 105 (e.g., base station 105-a, over communication link 220) in a transparent satellite configuration (e.g., when the satellite 120-a operates as a bent-pipe or regenerative transponder).

Figure 3:
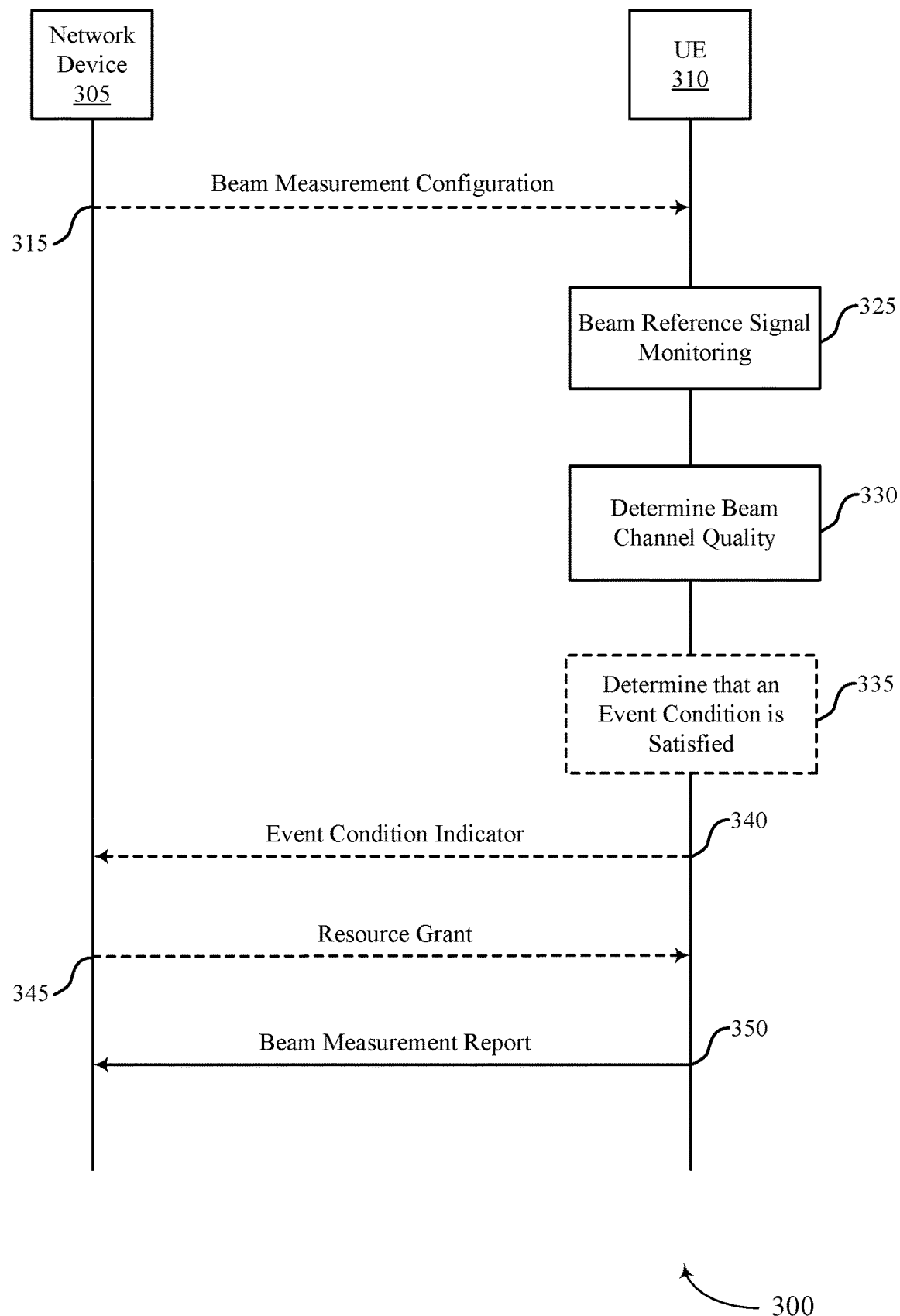
FIG. 3 illustrates an example of a process flow that supports beam measurement reporting in accordance with aspects of the present disclosure.

FIG. 3 illustrates an example of a process flow 300 that supports beam measurement reporting in accordance with aspects of the present disclosure. In some examples, the process flow 300 may implement aspects of wireless communications systems 100 or 200. For example, process flow 300 may include a network device 305, which may refer to a satellite 120, a combination of a satellite 120 and a gateway 210, or a base station 105, as described with reference the FIGS. 1 and 2. The process flow 300 may also include a UE 310, which may be an example of a UE 115 described with reference to FIGS. 1 and 2.

At 315, the network device 305 may transmit, and the UE 310 may receive, a beam measurement configuration associated with one or more beams (e.g., beams 230 as described with reference to FIG. 2). In some examples, each beam may be associated with a respective bandwidth part of a radio frequency spectrum according to a beam frequency mapping (e.g., where neighboring beams may be assigned to different bandwidth parts).

In various examples, the beam measurement configuration may configure the UE 310 to transmit beam measurement reports to the network device 305 periodically (e.g., as configured by RRC signaling), semi-persistently (e.g., as configured by RRC signaling and activated or deactivated by MAC signaling), aperiodically (e.g., network-initiated), or event-triggered (e.g., UE-initiated). In some examples, the beam measurement configuration of 315 may include an indication of CSI resources on various beams or bandwidth parts, such as frequency resources or timing occasions for monitoring CSI-RSs, SSBs, or other reference signals (e.g., reference signals 245 as described with reference to FIG. 2). In some examples, the beam measurement configuration of 315 may include a condition to start measuring candidate beams, such as configuring the UE 310 to start to measure a candidate or neighboring beam if the measurement on a current beam (e.g., a beam used for or most-recently used for communications with the UE 310) is worse than a threshold.

In some examples, the beam measurement configuration of 315 may include which of one or more event conditions the UE 310 should use to initiate generating or transmitting a beam measurement report, parameters related to measurement such as which beams to measure, or various parameters related to triggering conditions such as hysteresis, offsets, time-to-trigger, filtering coefficients, or any combination thereof. In some examples, the beam measurement configuration of 315 may include an indication of which measurements should be included in a beam measurement report, such as an RSRP, an RSRQ, an SINR, an SNR, or some other quantity or combination thereof.

In some examples, the beam measurement configuration of 315 may leverage another RRM configuration with an additional indication that the configuration is for beam-based measurement (e.g., a first indication of a radio resource management configuration and a second indication indicating that the radio resource management configuration is to be applied for measuring the one or more beams). In some examples, such an additional indication may be included inside each measurement object. In some examples, the beam measurement configuration of 315 may be indicated by a configuration field in an RRC reconfiguration message that configures the UE 310 for beam-based measurement.

In some examples, the beam measurement configuration of 315 may configure the UE 310 with one triggering quantity (e.g., RSRP only), or the UE 310 may be configured with multiple triggering quantities (e.g., RSRP and SINR) for measuring beams. In some examples, the beam measurement configuration of 315 may configure the UE 310 with one triggering event (e.g., one event condition), or the UE 310 may be configured with multiple triggering events (e.g., a set of two or more event conditions) for measuring beams or generating or transmitting measurement reports.

At 325, the UE 310 may monitor (e.g., based on the received beam measurement configuration) one or more reference signals associated with one or more beams, which may be associated with monitoring using one or more bandwidth parts associated with the one or more beams according to the beam frequency mapping. In some examples, the UE 310 may monitor a first reference signal in a first bandwidth part associated with a current beam (e.g., an active beam). In some examples, the monitoring may include monitoring a CSI-RS, an SSB, or some other reference signal or combination of reference signals.

At 330, the UE 310 may determine a beam channel quality for one or more beams based on the monitoring of 325 (e.g., based on measuring the reference signals). In some examples, the UE 310 may determine a channel quality of a first beam based on monitoring a first bandwidth part for a first reference signal corresponding to a first beam. The UE 310 may determine a channel quality using various beam quality metrics (e.g., related to measurement of a reference signal). For example, the UE 310 may determine the channel quality for a first beam as a value of RSRP, RSRQ, SINR, or any combination thereof.

In some examples, the UE 310 may be triggered to monitor or measure one or more beams, such as candidate beams or neighboring beams. For example, if a channel quality of the first beam satisfies a threshold channel quality (e.g., is worse than a threshold), then the UE 310 may measure secondary (e.g., neighboring) beams and determine respective channel quality metrics.

In some examples (e.g., to support examples of event-triggered beam measurement reporting), at 335, the UE 310 may determine that an event condition is satisfied based on determining a channel quality of one or more of the beams. For example, the UE 310 may identify various events based on channel quality of one or more beams, which may trigger the generation of a beam measurement report at the UE 310, which may accordingly be transmitted to the network device 305.

In some examples (e.g., an X1 event condition), the UE 310 may generate or transmit a beam measurement report based on determining that the channel quality for the first beam (e.g., the beam that UE 310 is currently monitoring) exceeds a threshold beam quality. For example, the UE 310 may determine that the event condition for X1 is satisfied based on determining that the measured beam quality ($Meas_c$) minus a hysteresis value (Hyst) is greater than a threshold beam quality (e.g., X1 is triggered if $Meas_c$−Hyst>Threshold). In some examples, the UE 310 may determine that an X1 event is canceled if $Meas_c$+Hyst<Threshold. In various examples, $Meas_c$ may be a measurement of RSRP (e.g., in dBm), RSRQ, or SINR (e.g., in dB). In various examples, a hysteresis value may be configured as a value between 0 and x dB, where x>0. In some examples, a time-to-trigger may indicate a time period (e.g., from a set of time periods) during or after which the UE 310 may identify the event X1, for example, if the UE 310 determines that the condition $Meas_c$−Hyst>Threshold is true for the time-to trigger period, then the UE 310 may trigger the event X1.

In some examples (e.g., an X2 event condition), the UE 310 may generate or transmit a beam measurement report based on determining that the channel quality for the first beam (e.g., the beam that UE 310 is currently monitoring) is less than a threshold beam quality, or that the beam channel quality is worse than the threshold beam quality. For example, the UE 310 may determine that the event condition for X2 is satisfied based on determining that the measured beam quality ($Meas_c$) plus a hysteresis value (Hyst) is less than a threshold beam quality. (e.g., X2 is triggered if $Meas_c$+Hyst<Threshold). In some examples, the UE 310 may determine that an X2 event is canceled if $Meas_c$−Hyst>Threshold. In various examples, $Meas_c$ may be a measurement of RSRP (e.g., in dBm), RSRQ, or SINR (e.g., in dB). In various examples, a hysteresis value may be configured as a value between 0 and x dB, where x>0. In some examples, a time-to-trigger may indicate a time period (e.g., from a set of time periods) during or after which the UE 310 may identify the event X2, for example, if the UE 310 determines that the condition $Meas_c$+Hyst<Threshold is true for the time-to trigger period, then the UE 310 may trigger the event X2.

In some examples (e.g., an X3 event condition), the UE 310 may generate or transmit a beam measurement report based on determining that the channel quality for a second beam (e.g., a neighboring beam, or a beam different from the beam that the UE 310 is currently monitoring) is greater than the first beam (e.g., the beam that the UE 310 is currently monitoring). For example, the UE 310 may determine that the event condition for X3 is satisfied based on determining that the measured beam quality of the neighboring beam ($Meas_n$) plus a reference signal specific offset of the neighboring beam ($O_{fn}$) plus a beam specific offset of the neighboring beam ($O_{bn}$) minus a hysteresis value (Hyst) is greater than that the measured beam quality of the current beam ($Meas_c$) plus a reference signal specific offset of the current beam ($O_{fc}$) plus a beam specific offset of the current beam ($O_{bc}$) plus an offset value. (e.g., X3 is triggered if $Meas_n$+$O_{fn}$+$O_{bn}$−Hyst>$Meas_c$+$O_{fc}$+$O_{bc}$+Offset). In some examples, the UE 310 may determine that an X3 event is canceled if $Meas_n$+$O_{fn}$+$O_{bn}$+Hyst<$Meas_c$+$Of_n$+$O_{bn}$+Offset. In various examples, $Meas_n$ and $Meas_c$ may be a measurement of RSRP (e.g., in dBm), RSRQ, or SINR (e.g., in dB). In some examples, a hysteresis value may be configured as a value between 0 and x dB, where x>0. $O_{fn}$ and $O_{fc}$ may be offsets specific to the reference signal associated with the neighboring beam and current beam, respectively, and may account for differences in transmit power. $O_{bn}$ and $O_{bc}$ may be beam-specific offsets associated with the neighboring beam and the current beam, respectively, and may account for beam preferences in the network. In some examples, if the UE 310 determines that the condition $Meas_n+O_{fn}+O_{bn}-Hyst>Meas_c+O_{fc}+O_{bc}+Offset$ is true for a time-to trigger period, then the UE 310 may trigger the event X3.

In some examples (e.g., an X4 event condition), the UE 310 may generate or transmit a beam measurement report based on determining that the channel quality for a second beam (e.g., a neighboring beam, or a beam different from the beam that the UE 310 is currently monitoring) is greater than or better than a threshold beam quality. For example, the UE 310 may determine that the event condition for X4 is satisfied based on determining that the measured beam quality of the neighboring beam ($Meas_n$) plus a reference signal specific offset of the neighboring beam ($O_{fn}$) plus a beam specific offset of the neighboring beam ($O_{bn}$) minus a hysteresis value (Hyst) is greater than a threshold value. (e.g., X4 is triggered if $Meas_n+O_{fn}+O_{bn}-Hyst>Threshold$). In some examples, the UE 310 may determine that an X4 event is canceled if $Meas_n+O_{fn}+O_{bn}+Hyst<Threshold$. In various examples, $Meas_n$ and $Meas_c$ may be a measurement of RSRP (e.g., in dBm), RSRQ, or SINR (e.g., in dB). In some examples, a hysteresis value may be configured as a value between 0 and x dB, where x>0. $O_{fn}$ and $O_{fc}$ may be offsets specific to the reference signal associated with the neighboring beam and current beam, respectively, and may account for differences in transmit power. $O_{bn}$ and $O_{bc}$ may be beam-specific offsets associated with the neighboring beam and the current beam, respectively, and may account for beam preferences in the network. In some examples, if the UE 310 determines that the condition $Meas_n+O_{fn}+O_{bn}-Hyst>Threshold$ is true for a time-to trigger period, then the UE 310 may trigger the event X4.

In some examples (e.g., an X5 event condition), the UE 310 may generate or transmit a beam measurement report based on determining that the channel quality associated the first beam (e.g., the beam that the UE 310 is currently monitoring) is worse than (e.g., less than) a first threshold, and that the channel quality associated with a second beam (e.g., a neighboring beam, or a beam different from the beam that the UE 310 is currently monitoring) is better than (e.g., exceeds) a second threshold. For example, the UE 310 may determine that the event condition for X5 is satisfied based on determining that the measured beam quality of the current beam ($Meas_c$) plus a hysteresis value is less than a first threshold (Threshold1) and that the measured beam quality of the neighboring beam ($Meas_n$) plus a reference signal specific offset of the neighboring beam ($O_{fn}$) plus a beam specific offset of the neighboring beam ($O_{bn}$) minus a hysteresis value (Hyst) is greater than a second threshold value. (e.g., X5 is triggered if $Meas_c+Hyst<Threshold\ 1$ and $Meas_n+O_{fn}+O_{bn}-Hyst>Threshold2$). In some examples, the UE 310 may determine that an X5 event is canceled if either $Meas_c-Hyst>Threshold\ 1$ or $Meas_n+O_{fn}+O_{bn}+Hyst<Threshold2$. In various examples, $Meas_n$ and $Meas_c$ may be a measurement of RSRP (e.g., in dBm), RSRQ, or SINR (e.g., in dB). In some examples, a hysteresis value may be configured as a value between 0 and x dB, where x>0. $O_{fn}$ and $O_{fc}$ may be offsets specific to the reference signal associated with the neighboring beam and current beam, respectively, and may account for differences in transmit power. $O_{bn}$ and $O_{bc}$ may be beam-specific offsets associated with the neighboring beam and the current beam, respectively, and may account for beam preferences in the network. In some examples, if the UE 310 determines that the condition $Meas_n+Hyst<Threshold\ 1$ and $Meas_n+O_{fn}+$ $O_{bn}-Hyst>Threshold2$ is true for a time-to trigger period, then the UE 310 may trigger the event X5.

In some examples (e.g., an X6 event condition), the UE 310 may generate or transmit a beam measurement report based on determining the best subset (e.g., N beams) out of a list of neighboring beams (e.g., M beams) becomes better than a current beam by a threshold. For example, the UE 310 may be located at an intersection or overlap of a plurality of beams or beam coverage areas (e.g., three beams). In some examples, the UE 310 may receive signaling from the network device 305 that indicates the set of M neighboring beams. In some examples, the UE 310 may determine that the event condition for X6 is satisfied based on determining that the channel quality of each of the subset of N beams ($Meas_{best}$) plus a reference signal specific offset of a best beam among the subset of N beams ($O_{f,best}$) plus a beam specific offset of a best beam among the subset of N beams ($O_{b,best}$) minus a hysteresis value is greater than the channel quality of the current beam ($Meas_c$) plus a reference signal specific offset of the current beam ($Of_c$) plus a beam specific offset of the current beam ($O_{b,c}$)) plus an offset (e.g., X6 is triggered if $Meas_{best}+O_{f,best}+O_{b,best}-Hyst>Meas_c+O_{fc}+O_{bc}+$ Offset, for each beam of the subset of N beams). In some examples, the UE 310 may determine that an X6 event is canceled if $Meas_{best}+O_{f,best}+Ob_{best}+Hyst<Meas_c+O_{fn}+O_{bn}+$ Offset for M-N+1 beams. In various examples, $Meas_c$ and $Meas_{best}$ may be a measurement of RSRP (e.g., in dBm), RSRQ, or SINR (e.g., in dB). In some examples, a hysteresis value may be configured as a value between 0 and x dB, where x>0. $O_{f,best}$ and $O_{b,best}$ may be respective reference signal specific and beam specific offsets of the best beam among the subset of N neighboring beams. $O_{fc}$ and $O_{bc}$ may be current beam counterparts of $O_{f,best}$ and $O_{b,best}$. In some examples, if the UE 310 determines that the condition $Meas_{best}+O_{f,best}+O_{b,best}-Hyst>Meas_c+O_{fc}+O_{bc}+Offset$, for each beam of the subset of N beams is true for a time-to trigger period, then the UE 310 may trigger the event X6. In some examples where the subset of N beams is equal to the set ofM beams, the event condition X6 may be reduced to the event condition X4 (e.g., UE 310 may generate a beam measurement report based on determining that the channel quality for the neighboring beam is greater than the current beam).

In some examples (e.g., an X7 event condition), the UE 310 may generate or transmit a beam measurement report, a beam failure instance (BFI) report, an out-of-sync report, or any combination thereof, based on a block error rate (BLER) configuration. For example, the UE 310 may determine a BLER value associated with communications over a first beam (e.g., the current beam), and may determine that the event condition for X7 is satisfied based on whether the BLER associated with the communications over the first beam is greater than a threshold BLER (e.g., $BLER_{mid}$). In some examples, the threshold BLER may be lower than a BLER threshold associated with determining a radio link failure. For example, in one configuration, a BLER threshold for an in-sync report may be 2%, and a BLER threshold for an out-of-sync report (e.g., for determining a radio link failure) may be 10%, and a BLER threshold for satisfying an X7 event condition may be 5%, where the in-sync report and the out-of-synch report may be destined to the RRC layer of the UE 310 only and not to the network device 305 (e.g., not to a gNB). In various examples, BLER thresholds may be adjusted to account for a HARQ feedback configuration, such as reducing the respective BLER thresholds by a factor of 10 in a HARQ-enabled configuration, or reducing the respective BLER thresholds by a factor of 100 in a HARQless configuration. In cases where the UE 310 determines that a measured BLER for a current beam exceeds the threshold BLER, then the UE 310 may determine that the event condition for X7 is satisfied, and the UE 310 may generate the beam measurement report.

At 350, the UE 310 may transmit a beam measurement report to the network device 305 (e.g., based on the determining the channel quality of one or more beams at 330, based on determining that one or more event conditions is satisfied at 335). The UE 310 may transmit the beam measurement report via an RRC message, a MAC CE, or other uplink control information (UCI) (e.g., over a PUCCH, multiplexed with other information over a PUSCH). In some examples, the report may include a beam ID (e.g., a CSI Reference Signal Resource Indicator (CRI), a synchronization signal block (SSB) index, a satellite beam ID). In some examples, the report may include a reported quantity (e.g., an L1-RSRP) associated with the beam ID. In some examples, the report may include a list of beams ordered according to the quality of the beams. In some examples, the report may include a configured beam measurement ID associated with a configured triggering event (e.g., one of an X1 through X7 event). In some cases, the UE 310 may be configured with a single triggering event (e.g., one of X1-X7), in which case the UE 310 may refrain from reporting the triggering event ID or measurement ID. In some other cases, the UE 310 may be configured with multiple triggering events, multiple measurement objects, or both, and the UE 310 may report the measurement ID.

In some examples, to transmit the beam measurement report, the UE 310 may identify a pre-configured resource, a semi-persistently configured resource (e.g., a resource whose activation may be based on the position of the UE 310 in the beam footprint), or dynamically allocated resource that the UE 310 may use for transmission of the beam report. For example, the UE 310 may receive a grant or a configuration message from the network device 305 that indicates resources that the UE 310 may use for the transmission of the beam measurement report at 350. In some examples, the UE 310 may prioritize the transmission of the beam status report (e.g., via logical channel prioritization).

In examples where the UE 310 transmits the beam measurement report in an RRC message, the UE 310 may reconfigure an existing RRC message or the UE 310 may generate a new RRC message. In some examples, an existing RRC message for RRM (e.g., Layer 3) measurement reporting may be extended to include the beam measurement report. In some examples, a critical extension of the existing RRC message may be defined for beam measurement reporting.

In some examples, at 350, the UE 310 may transmit the beam measurement report using a MAC CE. For example, the UE 310 may prioritize the transmission of the report (e.g., via logical channel prioritization), and the MAC CE based report may have higher priority than other signaling such as uplink data. In some examples, a MAC CE may report beam measurement statistics for a variable number of beams, (e.g., from 0 to N beams), which may include using a variable MAC-CE format, or using multiple fixed-size MAC CE formats to report a smaller report (e.g., a first portion) and a full report. In some examples, a beam measurement report MAC CE may trigger a scheduling request if there is no uplink resource (e.g., UL SCH resource) available for a new transmission or for a retransmission.

In some examples, at 350, the UE 310 may transmit the beam measurement report using bitmap reporting. For example, an RRC, a MAC CE, or a UCI report may include a bit map reporting from 0 to N beams. In some examples, an index of beams may be in a same order as configured by the network for a list of beams to measure. In some examples, a value of "1" may indicate that a beam meets a configured criteria (e.g., that an RSRP for the beam is greater than a threshold), and a value of "0" may indicate a beam does not meet a configured criteria. In some examples, the UE 310 may be configured with multiple triggering events or multiple measurement objects, and the UE 310 may report a given measurement ID.

In some examples, the UE 310 may be configured to support a variable support size, and thus variable details or content, depending on the resources available for transmitting the beam measurement report. For example, reporting may be divided into multiple parts according to importance. In some examples, a first part may include a type of the event, and a second part may include the reported quantities. A first part may involve a smaller quantity of bits, but may be associated with a higher priority than a second part. Thus, the UE 310 may report only the first part if the available resources are insufficient for sending a full report, or are just enough for sending the first part. In some examples, faster resources may be used to send more important portions of a beam measurement report. For example, UCI may be used to send a higher priority portion of beam measurement information, and a MAC CE or RRC message may be used to send a lower priority portion of beam measurement information. In some examples, the UE 310 may opportunistically multiplex the beam measurement report with RRC or MAC CE traffic. In some examples, a MAC CE may report statistics for a variable quantity of beams (e.g., from 0 to N beams), and a MAC CE format may be the same.

In some examples, the network device 305 and the UE 310 may be configured to support two-stage reporting of beam measurements. For example, at 340, the UE 310 may transmit, to the network device 305, an indication that an event condition is satisfied (e.g., in a first stage of beam measurement reporting) and, at 345, the network device 305 may transmit, and the UE 310 may receive, a grant of resources for transmitting a second stage of beam measurement reporting. In some examples, a first stage of the two-stage report may indicate an event type (e.g., X1-X7) that triggered an event-based reporting. Based on receiving the indication of the event condition being satisfied at the UE 310 (e.g., at 340), the network device 305 may be prompted to prioritize configuring uplink resources for a second part of beam measurement reporting. For example, the network device 305 may transmit a grant of resources (e.g., at 345) that the UE 310 may use for transmitting measurement quantities in a portion of the beam measurement report transmitted at 350.

Figure 4:
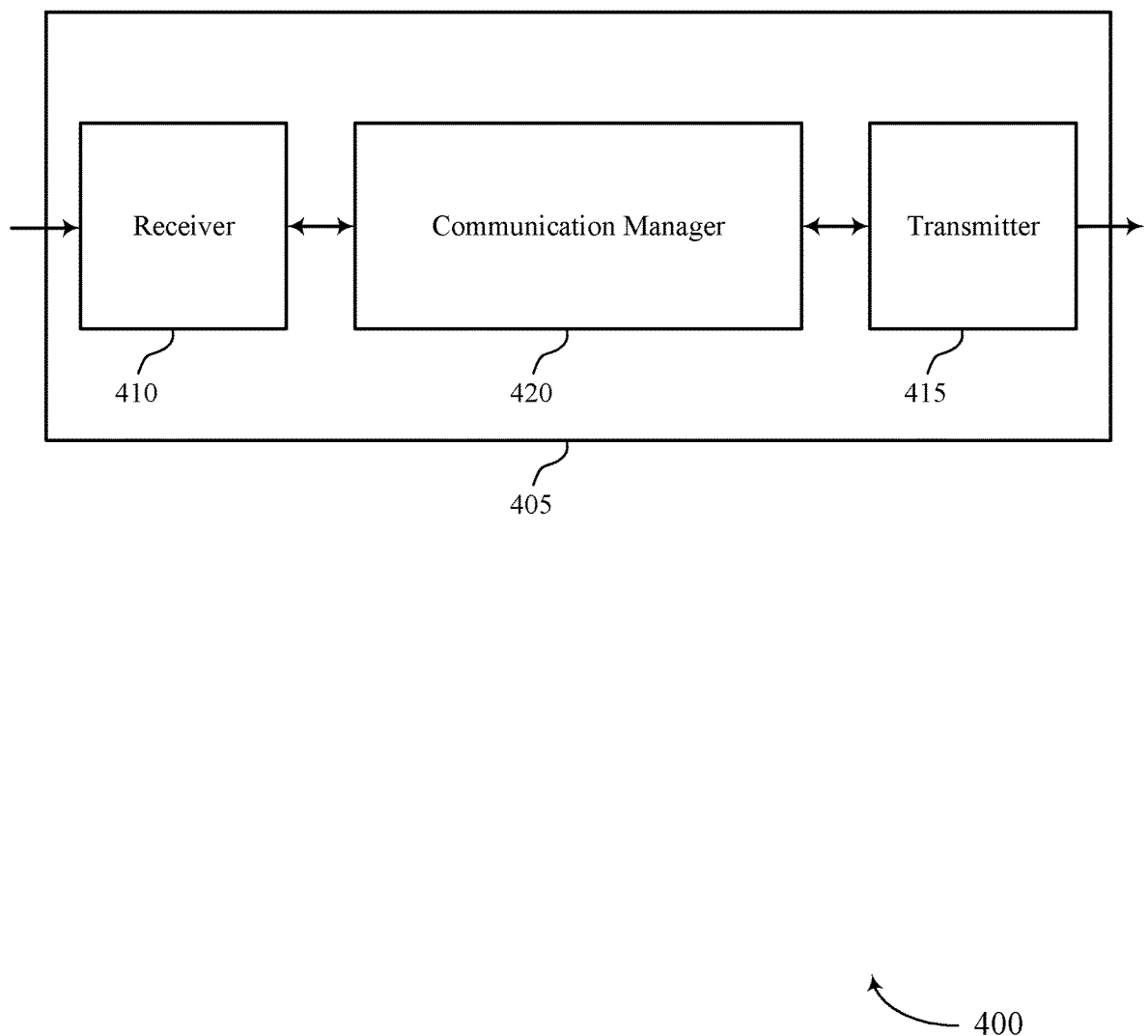
FIGS. 4 and 5 show block diagrams of devices that support beam measurement reporting in accordance with aspects of the present disclosure.

FIG. 4 shows a block diagram 400 of a device 405 that supports beam measurement reporting in accordance with aspects of the present disclosure. The device 405 may be an example of aspects of a UE 115 as described herein. The device 405 may include a receiver 410, a transmitter 415, and a communication manager 420. The device 405 may also include a processor. Each of these components may be in communication with one another (e.g., via one or more buses).

The receiver 410 may provide a means for receiving information such as packets, user data, or control information associated with various information channels (e.g., control channels, data channels, information related to beam measurement reporting). Information may be passed on to other components of the device 405. The receiver 410 may utilize a single antenna or a set of antennas.

The transmitter 415 may provide a means for transmitting signals generated by other components of the device 405. In some examples, the transmitter 415 may be co-located with a receiver 410 in a transceiver module. The transmitter 415 may utilize a single antenna or a set of antennas.

The communication manager 420, the receiver 410, the transmitter 415, or various combinations thereof or various components thereof, may be an example of a means for performing various aspects of beam measurement reporting as described herein.

In some examples, the communication manager 420, the receiver 410, the transmitter 415, or various combinations thereof or various components thereof, may be implemented in hardware (e.g., in communications management circuitry). The circuitry may include a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, in some examples, the communication manager 420, the receiver 410, the transmitter 415, or various combinations thereof or various components thereof, may be implemented in code (e.g., as communications management software or firmware) executed by a processor. If implemented in code executed by a processor, the functions of the communication manager 420, the receiver 410, the transmitter 415, or various combinations thereof or various components thereof, may be executed by a general-purpose processor, a DSP, a central processing unit (CPU), an ASIC, an FPGA or other programmable logic device.

In some examples, the communication manager 420 may be configured to perform various operations (e.g., receiving, monitoring, transmitting) using or otherwise in cooperation with the receiver 410, the transmitter 415, or both.

The communication manager 420 may support wireless communications at a UE in accordance with examples as disclosed herein. For example, the communication manager 420 may be configured to provide or support a means for receiving a beam measurement configuration associated with one or more beams, where each beam of the one or more beams is associated with a respective bandwidth part of one or more bandwidth parts of a radio frequency spectrum according to a beam frequency mapping. The communication manager 420 may be configured to provide or support a means for monitoring, based at least in part on the beam measurement configuration, a first reference signal in a first bandwidth part of the one or more bandwidth parts that is associated with a first beam of the one or more beams according to the beam frequency mapping. The communication manager 420 may be configured to provide or support a means for determining a channel quality of the first beam based on the monitoring of the first reference signal in the first bandwidth part. The communication manager 420 may be configured to provide or support a means for transmitting a beam measurement report based on the determining of the channel quality of the first beam.

By including or configuring the communication manager 420 in accordance with examples as disclosed herein, the device 405 may support improved techniques for beam measurement and mobility in a wireless communications system. For example, by configuring beam measurement reporting for beams that are each associated with a different bandwidth part, such as beams that may be employed by a network transmitter in an NTN, the communication manager 420 may support improved flexibility and responsiveness for maintaining a communication link using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by the device 405, where the device 405 may autonomously identify and generate a beam measurement report based on observing events associated with degrading beam quality, which may reduce power consumption or processing at the device 405 compared to other beam measurement techniques that do not involve UE-based measurement report initiation. These and other related improvements may be particularly beneficial in high mobility scenarios, such as an NTN, where movement of a transmitting device (e.g., a satellite 120), a receiving device (e.g., the device 405), or both may involve relatively frequent reselection of beams and corresponding bandwidth parts to maintain a communication link.

Figure 5:
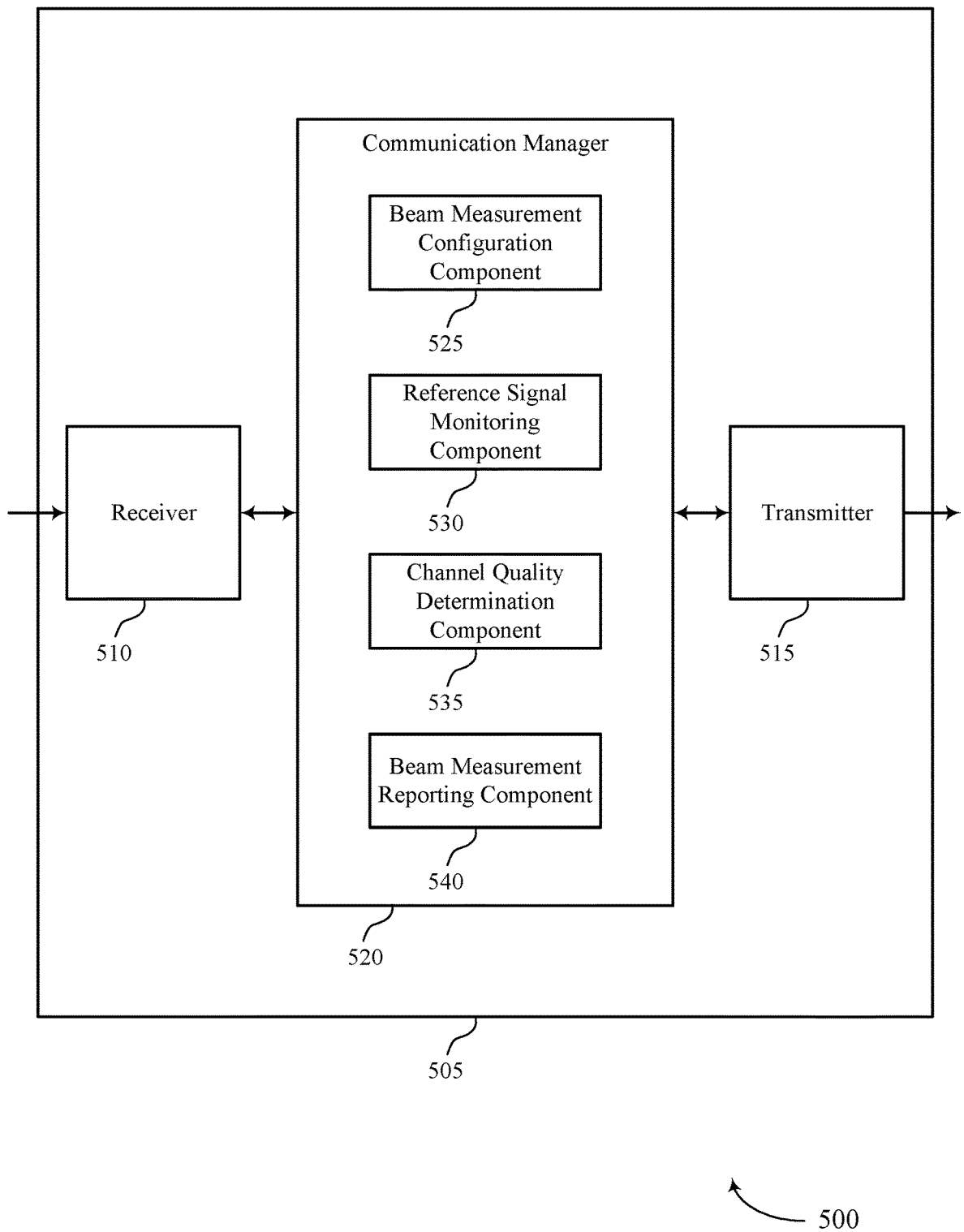

FIG. 5 shows a block diagram 500 of a device 505 that supports beam measurement reporting in accordance with aspects of the present disclosure. The device 505 may be an example of aspects of a device 405 or a UE 115 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to beam measurement reporting). Information may be passed on to other components of the device 505. The receiver 510 may utilize a single antenna or a set of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a set of antennas.

The device 505, or various components thereof, may be an example of means for performing various aspects of beam measurement reporting as described herein. For example, the communication manager 520 may include a beam measurement configuration component 525, a reference signal monitoring component 530, a channel quality determination component 535, a beam measurement reporting component 540, or any combination thereof. The communication manager 520 may be an example of aspects of a communication manager 420 as described herein. In some examples, the communication manager 520, or various components thereof, may be configured to perform various operations (e.g., receiving, monitoring, transmitting) using or otherwise in cooperation with the receiver 510, the transmitter 515, or both.

The communication manager 520 may support wireless communications at a UE in accordance with examples as disclosed herein. The beam measurement configuration component 525 may be configured to provide or support a means for receiving a beam measurement configuration associated with one or more beams, where each beam of the one or more beams is associated with a respective bandwidth part of one or more bandwidth parts of a radio frequency spectrum according to a beam frequency mapping. The reference signal monitoring component 530 may be configured to provide or support a means for monitoring, based on the beam measurement configuration, a first reference signal in a first bandwidth part of the one or more bandwidth parts that is associated with a first beam of the one or more beams according to the beam frequency mapping. The channel quality determination component 535 may be configured to provide or support a means for determining a channel quality of the first beam based on the monitoring of the first reference signal in the first bandwidth part. The beam measurement reporting component 540 may be configured to provide or support a means for transmitting a beam measurement report based on the determining of the channel quality of the first beam.

Figure 6:
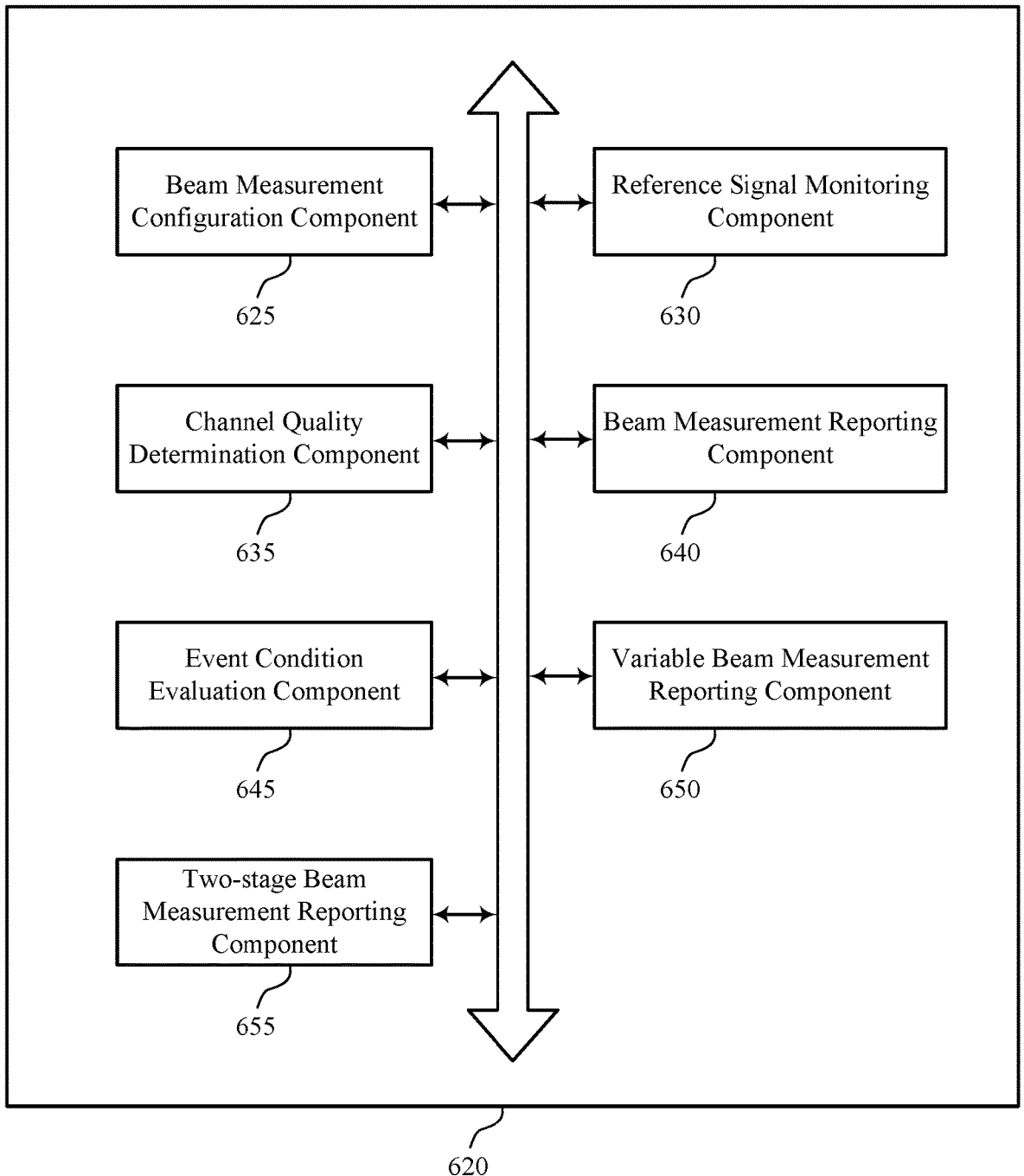
FIG. 6 shows a block diagram of a communication manager that supports beam measurement reporting in accordance with aspects of the present disclosure.

FIG. 6 shows a block diagram 600 of a communication manager 620 that supports beam measurement reporting in accordance with aspects of the present disclosure. The communication manager 620 may be an example of aspects of a communication manager 420, a communication manager 520, or both, as described herein. The communication manager 620, or various components thereof, may be an example of means for performing various aspects of beam measurement reporting as described herein. For example, the communication manager 620 may include a beam measurement configuration component 625, a reference signal monitoring component 630, a channel quality determination component 635, a beam measurement reporting component 640, an event condition evaluation component 645, a variable beam measurement reporting component 650, a two-stage beam measurement reporting component 655, or any combination thereof. Each of these components may communicate, directly or indirectly, with one another (e.g., via one or more buses).

The communication manager 620 may support wireless communications at a UE in accordance with examples as disclosed herein. The beam measurement configuration component 625 may be configured to provide or support a means for receiving a beam measurement configuration associated with one or more beams, where each beam of the one or more beams is associated with a respective bandwidth part of one or more bandwidth parts of a radio frequency spectrum according to a beam frequency mapping. The reference signal monitoring component 630 may be configured to provide or support a means for monitoring, based on the beam measurement configuration, a first reference signal in a first bandwidth part of the one or more bandwidth parts that is associated with a first beam of the one or more beams according to the beam frequency mapping. The channel quality determination component 635 may be configured to provide or support a means for determining a channel quality of the first beam based on the monitoring of the first reference signal in the first bandwidth part. The beam measurement reporting component 640 may be configured to provide or support a means for transmitting a beam measurement report based on the determining of the channel quality of the first beam.

In some examples, the event condition evaluation component 645 may be configured to provide or support a means for determining that an event condition is satisfied based on the determining the channel quality of the first beam. In some examples, the beam measurement reporting component 640 may be configured to provide or support a means for transmitting the beam measurement report based on the event condition evaluation component 645 determining that the event condition is satisfied.

In some examples, the reference signal monitoring component 630 may be configured to provide or support a means for monitoring, based on the beam measurement configuration, a second reference signal in a second bandwidth part of the one or more bandwidth parts that is associated with a second beam of the one or more beams according to the beam frequency mapping. In some examples, the channel quality determination component 635 may be configured to provide or support a means for determining a channel quality of the second beam based on the monitoring the second reference signal, and the determining that the event condition is satisfied may be based on the determining the channel quality of the second beam.

In some examples, to determine that the event condition is satisfied, the event condition evaluation component 645 may be configured to provide or support a means for determining that a respective channel quality of each beam of a plurality of beams neighboring the first beam, including the second beam and included in the one or more beams, is greater than the channel quality of the first beam by at least a threshold amount.

In some examples, the beam measurement configuration component 625 may be configured to provide or support a means for receiving a configuration to monitor a set of beams neighboring the first beam, the set of beams neighboring the first beam included in the one or more beams. In some examples, the reference signal monitoring component 630 may be configured to provide or support a means for monitoring, based on the configuration to monitor the set of beams neighboring the first beam, a respective reference signal in a respective bandwidth part that is associated with each beam of the plurality of beams neighboring the first beam according to the beam frequency mapping. In some examples, the channel quality determination component 635 may be configured to provide or support a means for determining, based on monitoring the respective reference signals, a respective channel quality of each beam of the set of beams, and the determining that the respective channel quality of each beam of the set of beams neighboring the first beam is greater than the channel quality of the first beam by at least the threshold amount may include determining that the channel quality of two or more beams of the set of beams neighboring the first beam is greater than the channel quality of the first beam by at least the threshold amount.

In some examples, to determine that the event condition is satisfied, the event condition evaluation component 645 may be configured to provide or support a means for determining that the channel quality of the second beam is greater than the channel quality of the first beam by at least a threshold amount.

In some examples, to determine that the event condition is satisfied, the event condition evaluation component 645 may be configured to provide or support a means for determining that the channel quality of the second beam is greater than a threshold channel quality.

In some examples, to determine that the event condition is satisfied, the event condition evaluation component 645 may be configured to provide or support a means for determining that the channel quality of the first beam is less than a first threshold channel quality, and determining that the channel quality of the second beam is greater than a second threshold channel quality.

In some examples, the channel quality determination component 635 may be configured to provide or support a means for determining that the channel quality of the first beam satisfies a threshold channel quality, and the monitoring the second reference signal may be based on the channel quality of the first beam satisfying the threshold channel quality.

In some examples, the channel quality determination component 635 may be configured to provide or support a means for determining the threshold channel quality based on receiving the beam measurement configuration, the threshold channel quality including a threshold RSRP, a threshold RSRQ, a threshold SINR, or a combination thereof.

In some examples, the event condition evaluation component 645 may be configured to provide or support a means for determining a BLER associated with communications using the first beam, and the determining that the event condition is satisfied may include determining that the BLER associated with the communications using the first beam is greater than a threshold BLER. In some examples, the threshold BLER may be lower than a BLER threshold associated with determining a radio link failure.

In some examples, to determine that the event condition is satisfied, the event condition evaluation component 645 may be configured to provide or support a means for determining that the channel quality of the first beam is greater than a threshold channel quality.

In some examples, to determine that the event condition is satisfied, the event condition evaluation component 645 may be configured to provide or support a means for determining that the channel quality of the first beam is less than a threshold channel quality.

In some examples, the two-stage beam measurement reporting component 655 may be configured to provide or support a means for transmitting an indication that the event condition is satisfied. In some examples, the two-stage beam measurement reporting component 655 may be configured to provide or support a means for receiving a grant of resources for the transmitting the beam measurement report.

In some examples, to transmit the beam measurement report, the beam measurement reporting component 640 may be configured to provide or support a means for transmitting a radio resource control message, a MAC CE, or uplink control information that includes the beam measurement report.

In some examples, the two-stage beam measurement reporting component 655 may be configured to provide or support a means for generating the MAC CE for the beam measurement report. In some examples, the two-stage beam measurement reporting component 655 may be configured to provide or support a means for transmitting a scheduling request, based on the generating the MAC CE, for requesting a transmission resource for transmitting the MAC CE, or for a retransmission of the MAC CE.

In some examples, the beam measurement report may include a bitmap reporting whether each beam of a set of beams satisfies one or more event conditions.

In some examples, to receive the beam measurement configuration, the beam measurement configuration component 625 may be configured to provide or support a means for receiving an indication of a set of event conditions for beam measurement reporting, or a set of signal quality measurements for beam measurement reporting, or a combination thereof.

In some examples, the event condition evaluation component 645 may be configured to provide or support a means for determining a channel quality threshold based on receiving the beam measurement configuration, the channel quality threshold including a threshold RSRP, a threshold RSRQ, a threshold SINR, or a combination thereof. In some examples, the event condition evaluation component 645 may be configured to provide or support a means for determining that the event condition is satisfied based on determining the channel quality threshold.

In some examples, to receive the beam measurement configuration, the beam measurement configuration component 625 may be configured to provide or support a means for receiving a first indication of a radio resource management configuration. In some examples, to receive the beam measurement configuration, the beam measurement configuration component 625 may be configured to provide or support a means for receiving a second indication indicating that the radio resource management configuration is to be applied for measuring the one or more beams.

In some examples, the variable beam measurement reporting component 650 may be configured to provide or support a means for determining to include one or more channel quality indications in the beam measurement report based on a size of a communications resource available for transmitting the beam measurement report.

In some examples, the one or more beams may be associated with a node of an NTN.

Figure 7:
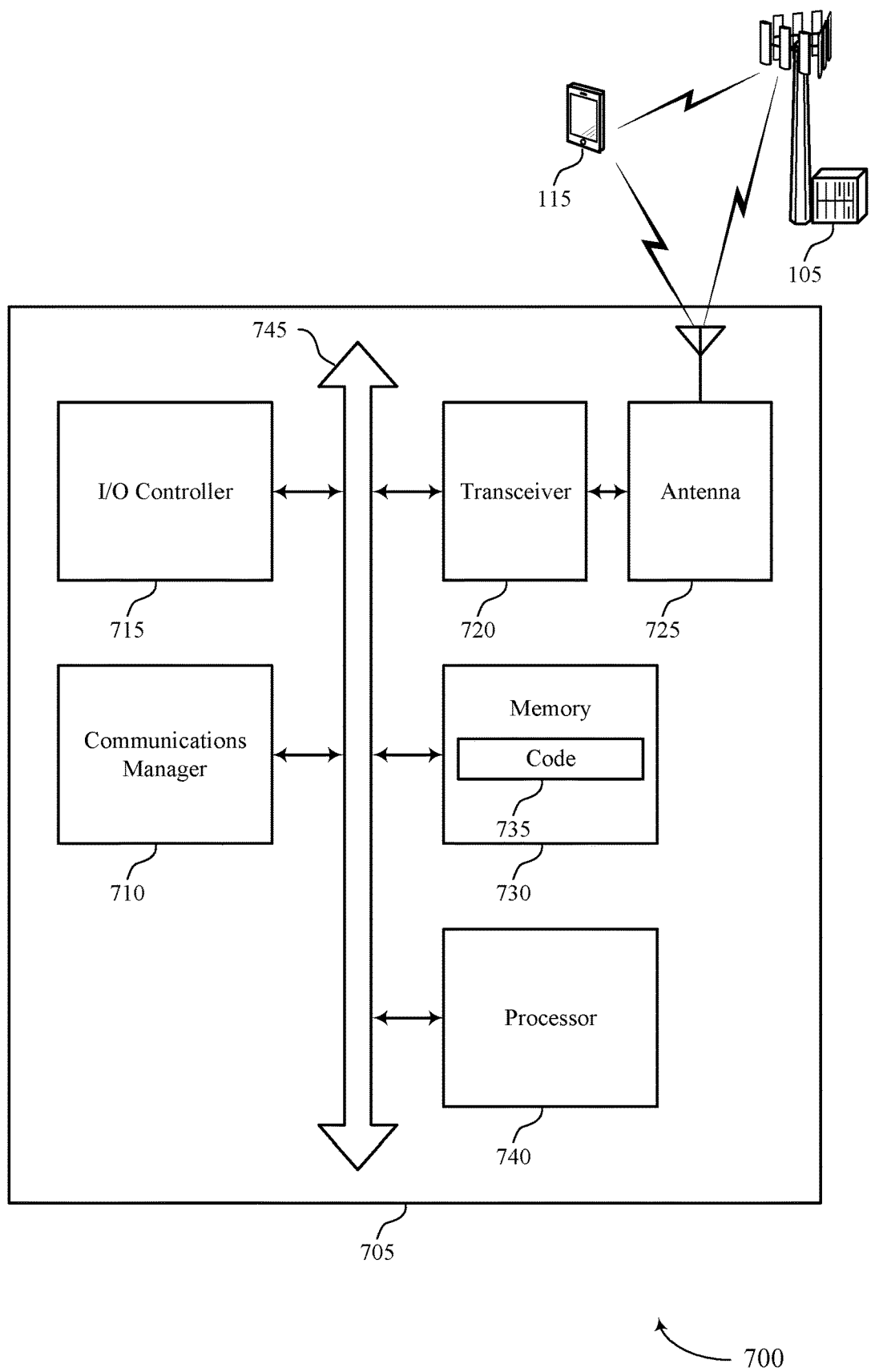
FIG. 7 shows a diagram of a system including a device that supports beam measurement reporting in accordance with aspects of the present disclosure.

FIG. 7 shows a diagram of a system 700 including a device 705 that supports beam measurement reporting in accordance with aspects of the present disclosure. The device 705 may be an example of or include the components of device 405, device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communication manager 710, a I/O controller 715, a transceiver 720, an antenna 725, a memory 730, a code 735, and a processor 740. These components may be in electronic communication or otherwise coupled (e.g., operatively, communicatively, functionally, electronically, electrically) via one or more buses (e.g., bus 745).

The I/O controller 715 may manage input and output signals for device 705. The I/O controller 715 may also manage peripherals not integrated into device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with device 705 via the I/O controller 715 or via hardware components controlled by the I/O controller 715.

In some cases, the device 705 may include a single antenna 725. However, in some cases the device may have more than one antenna 725, which may be capable of concurrently transmitting or receiving multiple wireless transmissions. The transceiver 720 may communicate bi-directionally, via the one or more antennas 725, wired, or wireless links as described herein. For example, the transceiver 720 may represent a wireless transceiver and may communicate bi-directionally with another wireless transceiver. The transceiver 720 may also include a modem to modulate the packets and provide the modulated packets to one or more antennas 725 for transmission, and to demodulate packets received from the one or more antennas 725. The transceiver 720, or the transceiver 720 and one or more antennas 725, may be an example of a transmitter 415, a transmitter 515, a receiver 410, a receiver 510, or any combination thereof or component thereof, as described herein.

The memory 730 may include random-access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting beam measurement reporting).

The communication manager 710 may support wireless communications at a UE in accordance with examples as disclosed herein. For example, the communication manager 710 may be configured to provide or support a means for receiving a beam measurement configuration associated with one or more beams, where each beam of the one or more beams is associated with a respective bandwidth part of one or more bandwidth parts of a radio frequency spectrum according to a beam frequency mapping. The communication manager 710 may be configured to provide or support a means for monitoring, based at least in part on the beam measurement configuration, a first reference signal in a first bandwidth part of the one or more bandwidth parts that is associated with a first beam of the one or more beams according to the beam frequency mapping. The communication manager 710 may be configured to provide or support a means for determining a channel quality of the first beam based on the monitoring of the first reference signal in the first bandwidth part. The communication manager 710 may be configured to provide or support a means for transmitting a beam measurement report based on the determining of the channel quality of the first beam.

By including or configuring the communication manager 710 in accordance with examples as disclosed herein, the device 705 may support improved techniques for beam measurement and mobility in a wireless communications system. For example, by configuring beam measurement reporting for beams that are each associated with a different bandwidth part, such as beams that may be employed by a network transmitter in an NTN, the communication manager 710 may support improved flexibility and responsiveness for maintaining a communication link using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by the device 705, where the device 705 may autonomously identify and generate a beam measurement report based on observing events associated with degrading beam quality, which may reduce power consumption or processing at the device 705 compared to other beam measurement techniques that do not involve UE-based measurement report initiation. These and other related improvements may be particularly beneficial in high mobility scenarios, such as an NTN, where movement of a transmitting device (e.g., a satellite 120), a receiving device (e.g., the device 705), or both may involve relatively frequent reselection of beams and corresponding bandwidth parts to maintain a communication link. Accordingly, including the communication manager 710 may improve a user experience associated with the device 705 by supporting more reliable, more flexible, or more diverse techniques for maintaining a communication link.

In some examples, the communication manager 710 may be configured to perform various operations (e.g., receiving, monitoring, transmitting) using or otherwise in cooperation with the transceiver 720, the one or more antennas 725, or any combination thereof. Although the communication manager 710 is illustrated as a separate component, in some examples, one or more functions described with reference to the communication manager 710 may be supported by or performed by the processor 740, the memory 730, the code 735, or any combination thereof. For example, the code 735 may include instructions executable by the processor 740 to cause the device 705 to perform various aspects of beam measurement reporting as described herein, or the processor 740 and the memory 730 may be otherwise configured to perform or support such operations.

Figure 8:
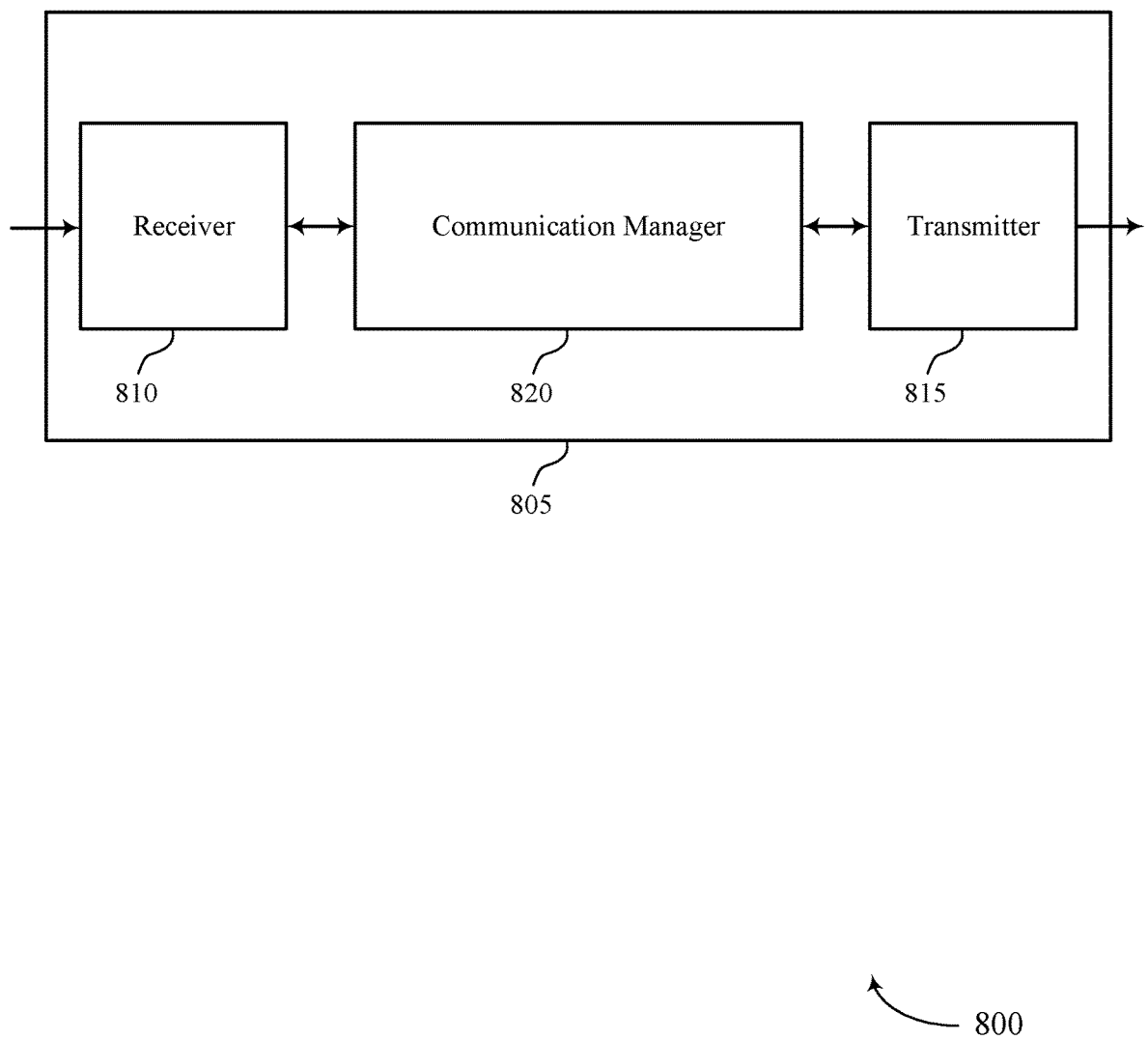
FIGS. 8 and 9 show block diagrams of devices that support beam measurement reporting in accordance with aspects of the present disclosure.

FIG. 8 shows a block diagram 800 of a device 805 that supports beam measurement reporting in accordance with aspects of the present disclosure. In various examples, the device 805 may be an example of aspects of a network device, a satellite 120, a gateway 210, a combination of a satellite 120 and a gateway 210, or a base station 105 as described herein. The device 805 may include a receiver 810, a transmitter 815, and a communication manager 820. The device 805 may also include a processor. Each of these components may be in communication with one another (e.g., via one or more buses).

The receiver 810 may provide a means for receiving information such as packets, user data, or control information associated with various information channels (e.g., control channels, data channels, information related to beam measurement reporting). Information may be passed on to other components of the device 805. The receiver 810 may utilize a single antenna or a set of antennas.

The transmitter 815 may provide a means for transmitting signals generated by other components of the device 805. In some examples, the transmitter 815 may be co-located with a receiver 810 in a transceiver module. The transmitter 815 may utilize a single antenna or a set of antennas.

The communication manager 820, the receiver 810, the transmitter 815, or various combinations thereof or various components thereof, may be an example of a means for performing various aspects of beam measurement reporting as described herein.

In some examples, communication manager 820, the receiver 810, the transmitter 815, or various combinations thereof or various components thereof, may be implemented in hardware (e.g., in communications management circuitry). The circuitry may include a processor, a DSP, an ASIC, an FPGA or other programmable logic device, discrete gate or transistor logic, discrete hardware components, or any combination thereof designed to perform the functions described in the present disclosure.

Additionally or alternatively, in some examples, communication manager 820, the receiver 810, the transmitter 815, or various combinations thereof or various components thereof, may be implemented in code (e.g., as communications management software or firmware) executed by a processor. If implemented in code executed by a processor, the functions of the communication manager 820, the receiver 810, the transmitter 815, or various combinations thereof or various components thereof, may be executed by a general-purpose processor, a DSP, a CPU, an ASIC, an FPGA or other programmable logic device.

In some examples, the communication manager 820 may be configured to perform various operations (e.g., receiving, monitoring, transmitting) using or otherwise in cooperation with the receiver 810, the transmitter 815, or both.

The communication manager 820 may support wireless communications at a network device in accordance with examples as disclosed herein. For example, the communication manager 820 may be configured to provide or support a means for transmitting a beam measurement configuration associated with one or more beams of the network device, where each beam of the one or more beams is associated with a respective bandwidth part of one or more bandwidth parts of a radio frequency spectrum according to a beam frequency mapping. The communication manager 820 may be configured to provide or support a means for transmitting reference signals using the one or more beams, where the transmitting the reference signals includes transmitting, for each beam of the one or more beams, a respective reference signal using the respective bandwidth part associated with the beam according to the beam frequency mapping. The communication manager 820 may be configured to provide or support a means for receiving, from a UE based on transmitting the reference signals using the one or more beams, a beam measurement report based on the beam measurement configuration.

By including or configuring the communication manager 820 in accordance with examples as disclosed herein, the device 805 may support improved techniques for beam measurement and mobility in a wireless communications system. For example, by configuring UEs 115 for beam measurement reporting for beams that are each associated with a different bandwidth part, such as beams that may be employed by a network transmitter in an NTN, the communication manager 820 may support improved flexibility and responsiveness for maintaining communication links with UEs 115 using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by UEs 115, where the UEs 115 may autonomously identify and generate a beam measurement report based on observing events associated with degrading beam quality, which may reduce power consumption or processing at the UEs 115 compared to other beam measurement techniques that do not involve UE-based measurement report initiation. These and other related improvements may be particularly beneficial in high mobility scenarios, such as an NTN, where movement of a transmitting device (e.g., the device 805), a receiving device (e.g., a UE 115), or both may involve relatively frequent reselection of beams and corresponding bandwidth parts to maintain a communication link.

Figure 9:
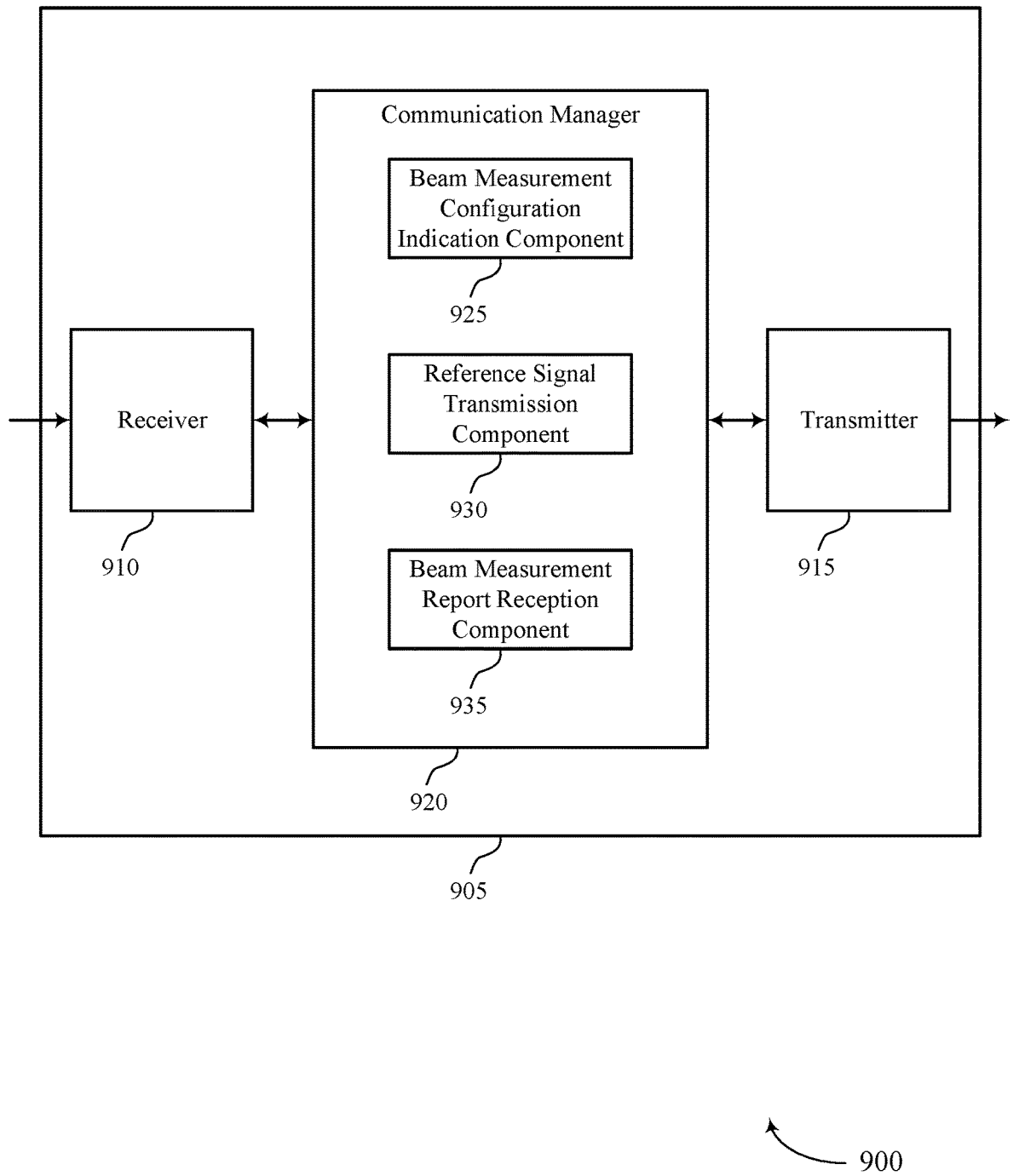

FIG. 9 shows a block diagram 900 of a device 905 that supports beam measurement reporting in accordance with aspects of the present disclosure. In various examples, the device 905 may be an example of aspects of a network device, a device 805, a satellite 120, a gateway 210, a combination of a satellite 120 and a gateway 210, or a base station 105 as described herein. The device 905 may include a receiver 910, a transmitter 915, and a communication manager 920. The device 905 may also include a processor. Each of these components may be in communication with one another (e.g., via one or more buses).

The receiver 910 may provide a means for receiving information such as packets, user data, or control information associated with various information channels (e.g., control channels, data channels, information related to beam measurement reporting). Information may be passed on to other components of the device 905. The receiver 910 may utilize a single antenna or a set of antennas.

The transmitter 915 may provide a means for transmitting signals generated by other components of the device 905. In some examples, the transmitter 915 may be co-located with a receiver 910 in a transceiver module. The transmitter 915 may utilize a single antenna or a set of antennas.

The device 905, or various components thereof, may be an example of means for performing various aspects of beam measurement reporting as described herein. For example, the communication manager 920 may include a beam measurement configuration indication component 925, a reference signal transmission component 930, a beam measurement report reception component 935, or any combination thereof. The communication manager 920 may be an example of aspects of a communication manager 820 as described herein. In some examples, the communication manager 920, or various components thereof, may be configured to perform various operations (e.g., receiving, monitoring, transmitting) using or otherwise in cooperation with the receiver 910, the transmitter 915, or both.

The communication manager 920 may support wireless communications at a network device in accordance with examples as disclosed herein. The beam measurement configuration indication component 925 may be configured to provide or support a means for transmitting a beam measurement configuration associated with one or more beams of the network device, where each beam of the one or more beams is associated with a respective bandwidth part of one or more bandwidth parts of a radio frequency spectrum according to a beam frequency mapping. The reference signal transmission component 930 may be configured to provide or support a means for transmitting reference signals using the one or more beams, where the transmitting the reference signals includes transmitting, for each beam of the one or more beams, a respective reference signal using the respective bandwidth part associated with the beam according to the beam frequency mapping. The beam measurement report reception component 935 may be configured to provide or support a means for receiving, from a UE based on transmitting the reference signals using the one or more beams, a beam measurement report based on the beam measurement configuration.

Figure 10:
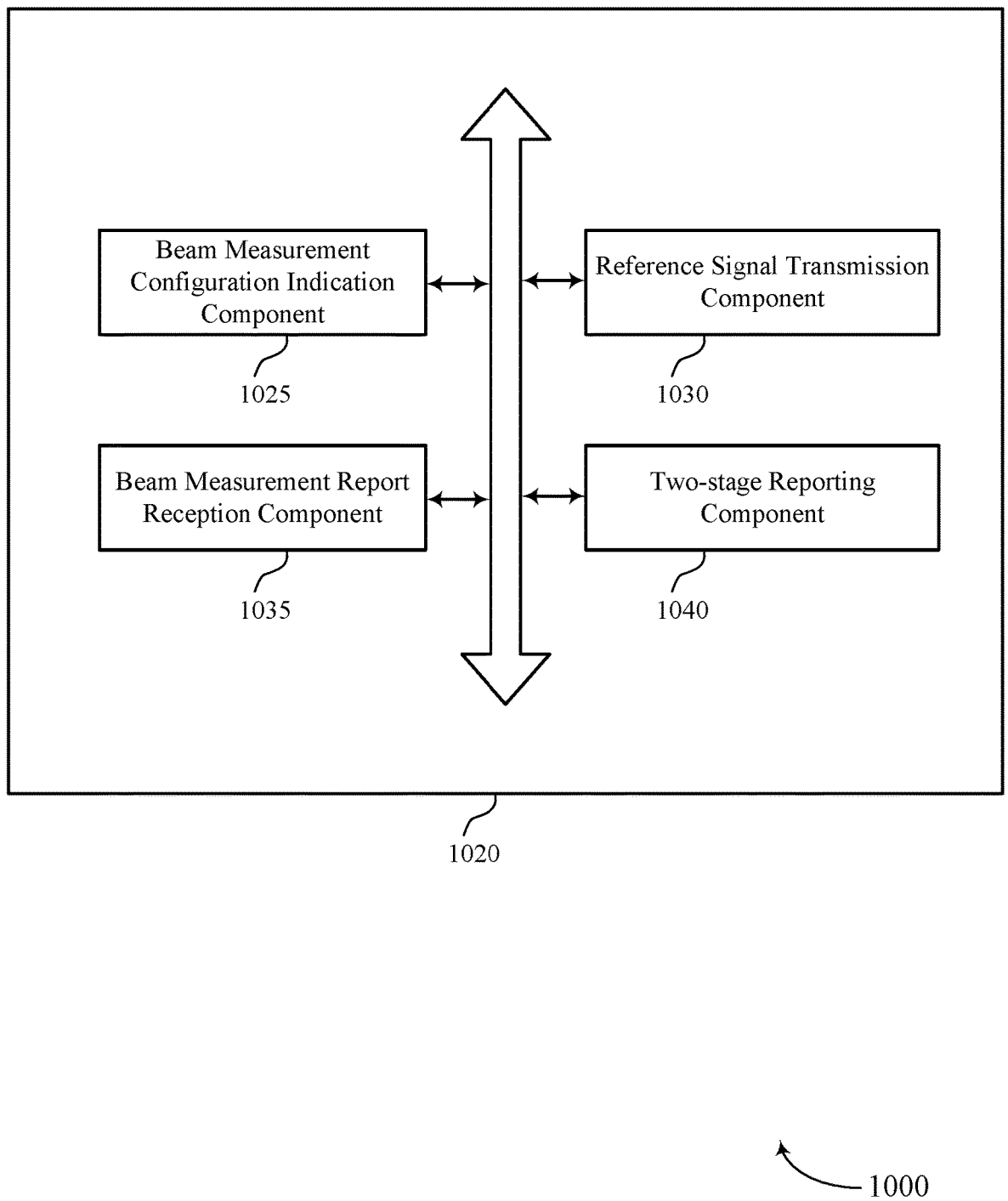
FIG. 10 shows a block diagram of a communication manager that supports beam measurement reporting in accordance with aspects of the present disclosure.

FIG. 10 shows a block diagram 1000 of a communication manager 1020 that supports beam measurement reporting in accordance with aspects of the present disclosure. The communication manager 1020 may be an example of aspects of a communication manager 820, a communication manager 920, or both, as described herein. The communication manager 1020, or various components thereof, may be an example of means for performing various aspects of beam measurement reporting as described herein. For example, the communication manager 1020 may include a beam measurement configuration indication component 1025, a reference signal transmission component 1030, a beam measurement report reception component 1035, a two-stage reporting component 1040, or any combination thereof. Each of these components may communicate, directly or indirectly, with one another (e.g., via one or more buses).

The communication manager 1020 may support wireless communications at a network device in accordance with examples as disclosed herein. The beam measurement configuration indication component 1025 may be configured to provide or support a means for transmitting a beam measurement configuration associated with one or more beams of the network device, where each beam of the one or more beams is associated with a respective bandwidth part of one or more bandwidth parts of a radio frequency spectrum according to a beam frequency mapping. The reference signal transmission component 1030 may be configured to provide or support a means for transmitting reference signals using the one or more beams, where the transmitting the reference signals includes transmitting, for each beam of the one or more beams, a respective reference signal using the respective bandwidth part associated with the beam according to the beam frequency mapping. The beam measurement report reception component 1035 may be configured to provide or support a means for receiving, from a UE based on transmitting the reference signals using the one or more beams, a beam measurement report based on the beam measurement configuration.

In some examples, the beam measurement configuration may indicate an event condition for initiating beam measurement reporting by the UE.

In some examples, to transmit the beam measurement configuration, the beam measurement configuration indication component 1025 may be configured to provide or support a means for transmitting an indication for the UE to transmit the beam measurement report based on a respective channel quality of a plurality of beams being greater than a channel quality of a reference beam by at least a threshold amount.

In some examples, the beam measurement configuration indication component 1025 may be configured to provide or support a means for transmitting a configuration for the UE to monitor a set of beams neighboring the reference beam, the set of beams including the plurality of beams.

In some examples, to transmit the beam measurement configuration, the beam measurement configuration indication component 1025 may be configured to provide or support a means for transmitting an indication for the UE to transmit the beam measurement report based on a channel quality of a second beam being greater than a channel quality of a reference beam by at least a threshold amount.

In some examples, to transmit the beam measurement configuration, the beam measurement configuration indication component 1025 may be configured to provide or support a means for transmitting an indication for the UE to transmit the beam measurement report based on a channel quality of a second beam, different than a reference beam, being greater than a threshold channel quality.

In some examples, to transmit the beam measurement configuration, the beam measurement configuration indication component 1025 may be configured to provide or support a means for transmitting an indication for the UE to transmit the beam measurement report based on a channel quality of a first beam being less than a first threshold channel quality, and based on a channel quality of a second beam being greater than a second threshold channel quality.

In some examples, to transmit the beam measurement configuration, the beam measurement configuration indication component 1025 may be configured to provide or support a means for transmitting an indication for the UE to monitor a second reference signal associated with a second beam based on a channel quality of a first beam satisfying a threshold channel quality.

In some examples, the indication for the UE to monitor the second reference signal includes a threshold RSRP, a threshold RSRQ, a threshold SINR, or a combination thereof.

In some examples, to transmit the beam measurement configuration, the beam measurement configuration indication component 1025 may be configured to provide or support a means for transmitting an indication for the UE to transmit the beam measurement report based on a BLER associated with communications using a beam being greater than a threshold BLER.

In some examples, the threshold BLER may be lower than a BLER threshold associated with determining a radio link failure.

In some examples, to transmit the beam measurement configuration, the beam measurement configuration indication component 1025 may be configured to provide or support a means for transmitting an indication for the UE to transmit the beam measurement report based on a channel quality of a reference beam being greater than a threshold channel quality.

In some examples, to transmit the beam measurement configuration, the beam measurement configuration indication component 1025 may be configured to provide or support a means for transmitting an indication for the UE to transmit the beam measurement report based on a channel quality of a reference beam being less than a threshold channel quality.

In some examples, the two-stage reporting component 1040 may be configured to provide or support a means for receiving, from the UE, an indication that the event condition is satisfied. In some examples, the two-stage reporting component 1040 may be configured to provide or support a means for transmitting, based on receiving the indication that the event condition is satisfied, a grant of resources for the UE to use for the transmitting the beam measurement report.

In some examples, to transmit the beam measurement configuration, the beam measurement configuration indication component 1025 may be configured to provide or support a means for transmitting an indication of a set of event conditions for beam measurement reporting, or a set of signal quality measurements for beam measurement reporting, or a combination thereof.

In some examples, to transmit the beam measurement configuration, the beam measurement configuration indication component 1025 may be configured to provide or support a means for transmitting an indication of a threshold channel quality associated with determining that the event condition is satisfied, the threshold channel quality including a threshold RSRP, a threshold RSRQ, a threshold SINR, or a combination thereof.

In some examples, to transmit the beam measurement configuration, the beam measurement configuration indication component 1025 may be configured to provide or support a means for transmitting a first indication of a radio resource management configuration. In some examples, to transmit the beam measurement configuration, the beam measurement configuration indication component 1025 may be configured to provide or support a means for transmitting a second indication indicating that the radio resource management configuration is to be applied for measuring the one or more beams each associated with the respective bandwidth part.

In some examples, the network device may be a node of an NTN.

Figure 11:
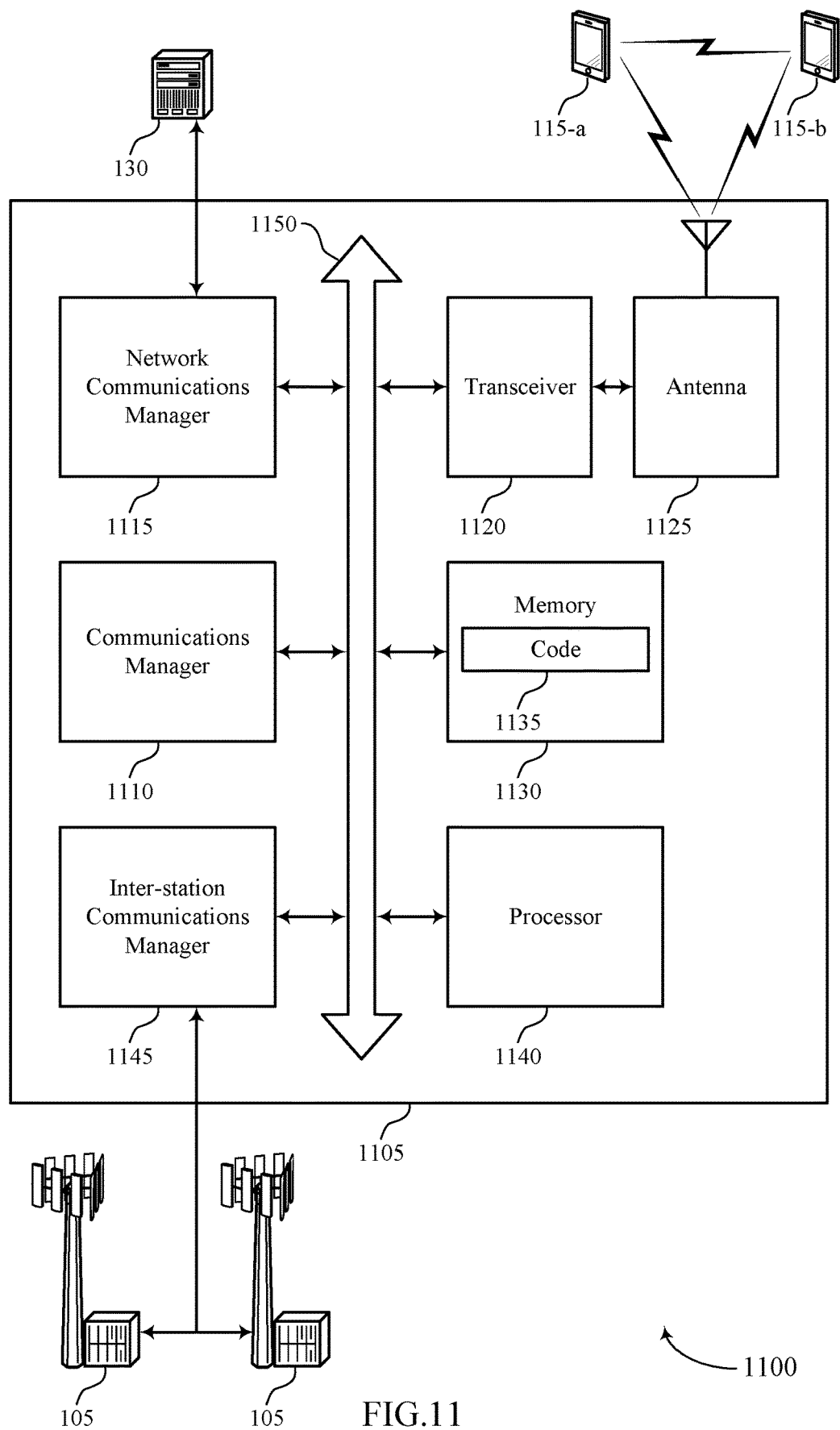
FIG. 11 shows a diagram of a system including a device that supports beam measurement reporting in accordance with aspects of the present disclosure.

FIG. 11 shows a diagram of a system 1100 including a device 1105 that supports beam measurement reporting in accordance with aspects of the present disclosure. The device 1105 may be an example of or include the components of a network device, a device 805, device 905, a satellite 120, a gateway 210, a combination of a satellite 120 and a gateway 210, or a base station 105 as described herein. The device 1105 may communicate wirelessly with one or more base stations 105, UEs 115, or any combination thereof. The device 1105 may include components for bi-directional voice and data communications including components for transmitting and receiving communications, including a communication manager 1110, a network communications manager 1115, a transceiver 1120, an antenna 1125, a memory 1130, a code 1135, a processor 1140, and an inter-station communications manager 1145. These components may be in electronic communication or otherwise coupled (e.g., operatively, communicatively, functionally, electronically, electrically) via one or more buses (e.g., bus 1150).

The network communications manager 1115 may manage communications with the core network (e.g., via one or more wired backhaul links). For example, the network communications manager 1115 may manage the transfer of data communications for client devices, such as one or more UEs 115.

In some cases, the device 1105 may include a single antenna 1125. However, in some cases the device may have more than one antenna 1125, which may be capable of concurrently transmitting or receiving multiple wireless transmissions. The transceiver 1120 may communicate bi-directionally, via the one or more antennas 1125, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to one or more antennas 1125 for transmission, and to demodulate packets received from the one or more antennas 1125. The transceiver 1120, or the transceiver 1120 and one or more antennas 1125, may be an example of a transmitter 815, a transmitter 915, a receiver 810, a receiver 910, or any combination thereof or component thereof, as described herein.

The memory 1130 may include random-access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam measurement reporting).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The communication manager 1110 may support wireless communications at a network device in accordance with examples as disclosed herein. For example, the communication manager 1110 may be configured to provide or support a means for transmitting a beam measurement configuration associated with one or more beams of the network device, where each beam of the one or more beams is associated with a respective bandwidth part of one or more bandwidth parts of a radio frequency spectrum according to a beam frequency mapping. The communication manager 1110 may be configured to provide or support a means for transmitting reference signals using the one or more beams, where the transmitting the reference signals includes transmitting, for each beam of the one or more beams, a respective reference signal using the respective bandwidth part associated with the beam according to the beam frequency mapping. The communication manager 1110 may be configured to provide or support a means for receiving, from a UE based on transmitting the reference signals using the one or more beams, a beam measurement report based on the beam measurement configuration.

By including or configuring the communication manager 1110 in accordance with examples as disclosed herein, the device 1105 may support improved techniques for beam measurement and mobility in a wireless communications system. For example, by configuring UEs 115 for beam measurement reporting for beams that are each associated with a different bandwidth part, such as beams that may be employed by a network transmitter in an NTN, the communication manager 1110 may support improved flexibility and responsiveness for maintaining communication links with UEs 115 using different beams that are associated with different frequency intervals. For example, compared to techniques that do not account for neighboring beams being configured according to different frequency intervals, the techniques described herein may enable faster, more efficient, or more flexible beam selection, among other benefits. Further, the described techniques may be combined with event-based initiation of measurement reporting by UEs 115, where the UEs 115 may autonomously identify and generate a beam measurement report based on observing events associated with degrading beam quality, which may reduce power consumption or processing at the UEs 115 compared to other beam measurement techniques that do not involve UE-based measurement report initiation. These and other related improvements may be particularly beneficial in high mobility scenarios, such as an NTN, where movement of a transmitting device (e.g., the device 1105), a receiving device (e.g., a UE 115), or both may involve relatively frequent reselection of beams and corresponding bandwidth parts to maintain a communication link. Accordingly, including the communication manager 1110 may improve user experience associated with UEs 115 by supporting more reliable, more flexible, or more diverse techniques for maintaining a communication link.

In some examples, the communication manager 1110 may be configured to perform various operations (e.g., receiving, monitoring, transmitting) using or otherwise in cooperation with the transceiver 1120, the one or more antennas 1125, or any combination thereof. Although the communication manager 1110 is illustrated as a separate component, in some examples, one or more functions described with reference to the communication manager 1110 may be supported by or performed by the processor 1140, the memory 1130, the code 1135, or any combination thereof. For example, the code 1135 may include instructions executable by the processor 1140 to cause the device 1105 to perform various aspects of beam measurement reporting as described herein, or the processor 1140 and the memory 1130 may be otherwise configured to perform or support such operations.

Figure 12:
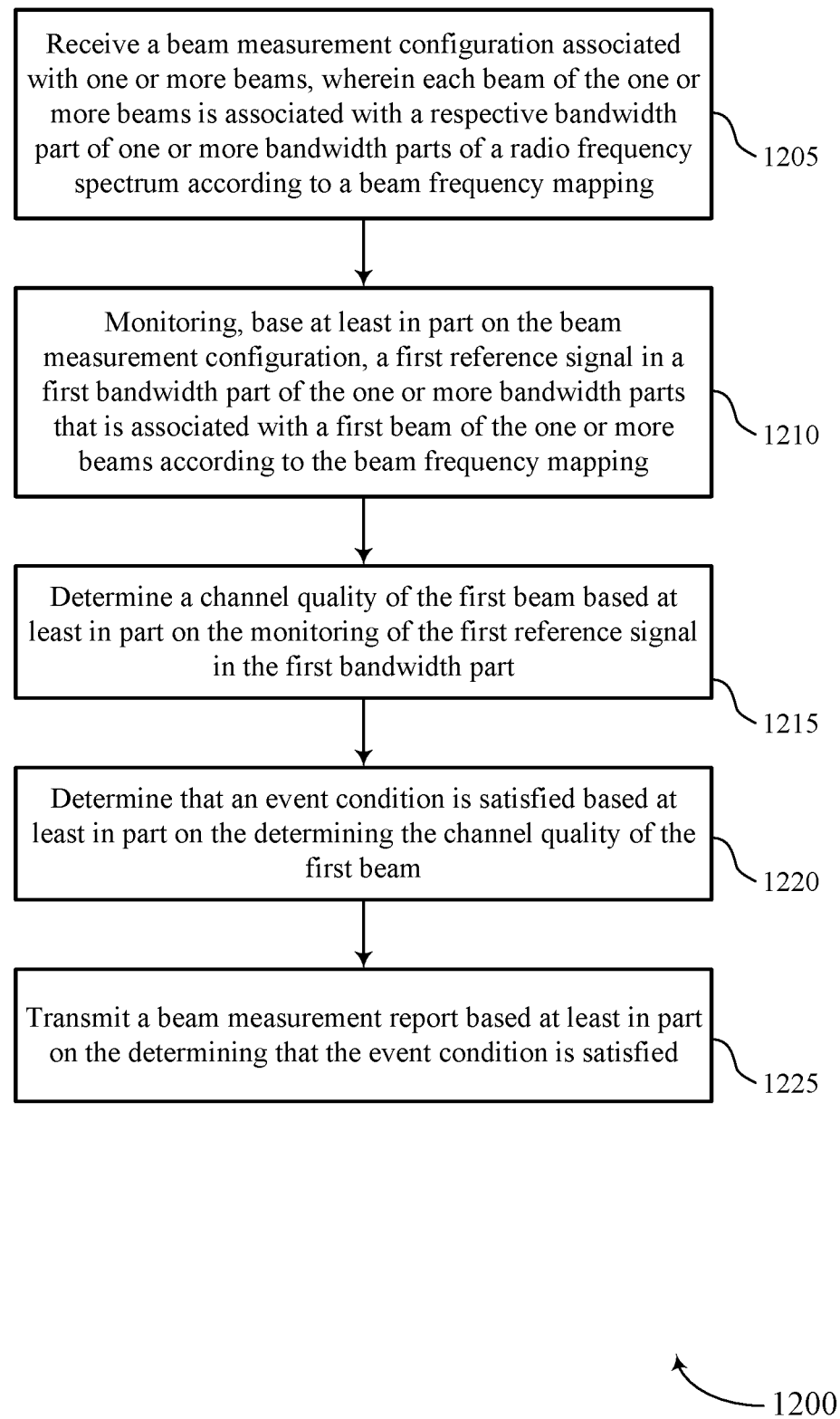
FIGS. 12 through 15 show flowcharts illustrating methods that support beam measurement reporting in accordance with aspects of the present disclosure.

FIG. 12 shows a flowchart illustrating a method 1200 for beam measurement reporting in accordance with aspects of the present disclosure. The operations of method 1200 may be implemented by a UE or its components as described herein. For example, the operations of method 1200 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1205, the method may include receiving a beam measurement configuration associated with one or more beams, wherein each beam of the one or more beams is associated with a respective bandwidth part of one or more bandwidth parts of a radio frequency spectrum according to a beam frequency mapping. The operations of 1205 may be performed according to the methods described herein. In some examples, aspects of the operations of 1205 may be performed by a beam measurement configuration component 625 as described with reference to FIG. 6.

At 1210, the method may include monitoring, based at least in part on the beam measurement configuration, a first reference signal in a first bandwidth part of the one or more bandwidth parts that is associated with a first beam of the one or more beams according to the beam frequency mapping. The operations of 1210 may be performed according to the methods described herein. In some examples, aspects of the operations of 1210 may be performed by a reference signal monitoring component 630 as described with reference to FIG. 6.

At 1215, the method may include determining a channel quality of the first beam based at least in part on the monitoring of the first reference signal in the first bandwidth part. The operations of 1215 may be performed according to the methods described herein. In some examples, aspects of the operations of 1215 may be performed by a channel quality determination component 635 as described with reference to FIG. 6.

At 1220, the method may include determining that an event condition is satisfied based at least in part on the determining the channel quality of the first beam. The operations of 1220 may be performed according to the methods described herein. In some examples, aspects of the operations of 1220 may be performed by an event condition evaluation component 645 as described with reference to FIG. 6.

At 1225, the method may include transmitting a beam measurement report based at least in part on the determining that the event condition is satisfied. The operations of 1225 may be performed according to the methods described herein. In some examples, aspects of the operations of 1225 may be performed by a beam measurement reporting component 640 as described with reference to FIG. 6.

Figure 13:
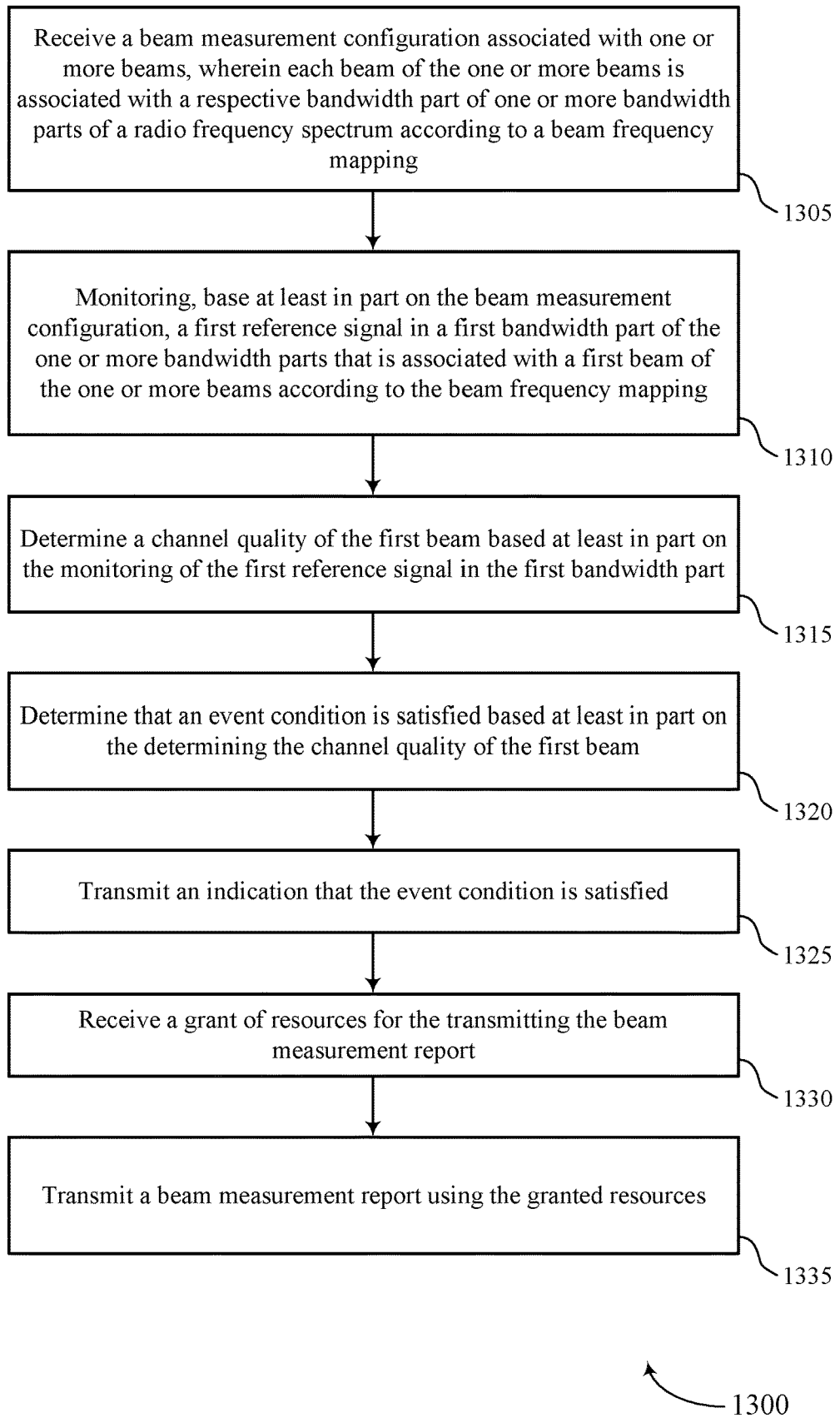

FIG. 13 shows a flowchart illustrating a method 1300 for beam measurement reporting in accordance with aspects of the present disclosure. The operations of method 1300 may be implemented by a UE or its components as described herein. For example, the operations of method 1300 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1305, the method may include receiving a beam measurement configuration associated with one or more beams, wherein each beam of the one or more beams is associated with a respective bandwidth part of one or more bandwidth parts of a radio frequency spectrum according to a beam frequency mapping. The operations of 1305 may be performed according to the methods described herein. In some examples, aspects of the operations of 1305 may be performed by a beam measurement configuration component 625 as described with reference to FIG. 6.

At 1310, the method may include monitoring, based at least in part on the beam measurement configuration, a first reference signal in a first bandwidth part of the one or more bandwidth parts that is associated with a first beam of the one or more beams according to the beam frequency mapping. The operations of 1310 may be performed according to the methods described herein. In some examples, aspects of the operations of 1310 may be performed by a reference signal monitoring component 630 as described with reference to FIG. 6.

At 1315, the method may include determining a channel quality of the first beam based at least in part on the monitoring of the first reference signal in the first bandwidth part. The operations of 1315 may be performed according to the methods described herein. In some examples, aspects of the operations of 1315 may be performed by a channel quality determination component 635 as described with reference to FIG. 6.

At 1320, the method may include determining that an event condition is satisfied based at least in part on the determining the channel quality of the first beam. The operations of 1320 may be performed according to the methods described herein. In some examples, aspects of the operations of 1320 may be performed by an event condition evaluation component 645 as described with reference to FIG. 6.

At 1325, the method may include transmitting an indication that the event condition is satisfied. The operations of 1325 may be performed according to the methods described herein. In some examples, aspects of the operations of 1325 may be performed by a two-stage beam measurement reporting component 655 as described with reference to FIG. 6.

At 1330, the method may include receiving a grant of resources for the transmitting the beam measurement report. The operations of 1330 may be performed according to the methods described herein. In some examples, aspects of the operations of 1330 may be performed by a two-stage beam measurement reporting component 655 as described with reference to FIG. 6.

At 1335, the method may include transmitting a beam measurement report using the granted resources. The operations of 1335 may be performed according to the methods described herein. In some examples, aspects of the operations of 1335 may be performed by a beam measurement reporting component 640 as described with reference to FIG. 6.

Figure 14:
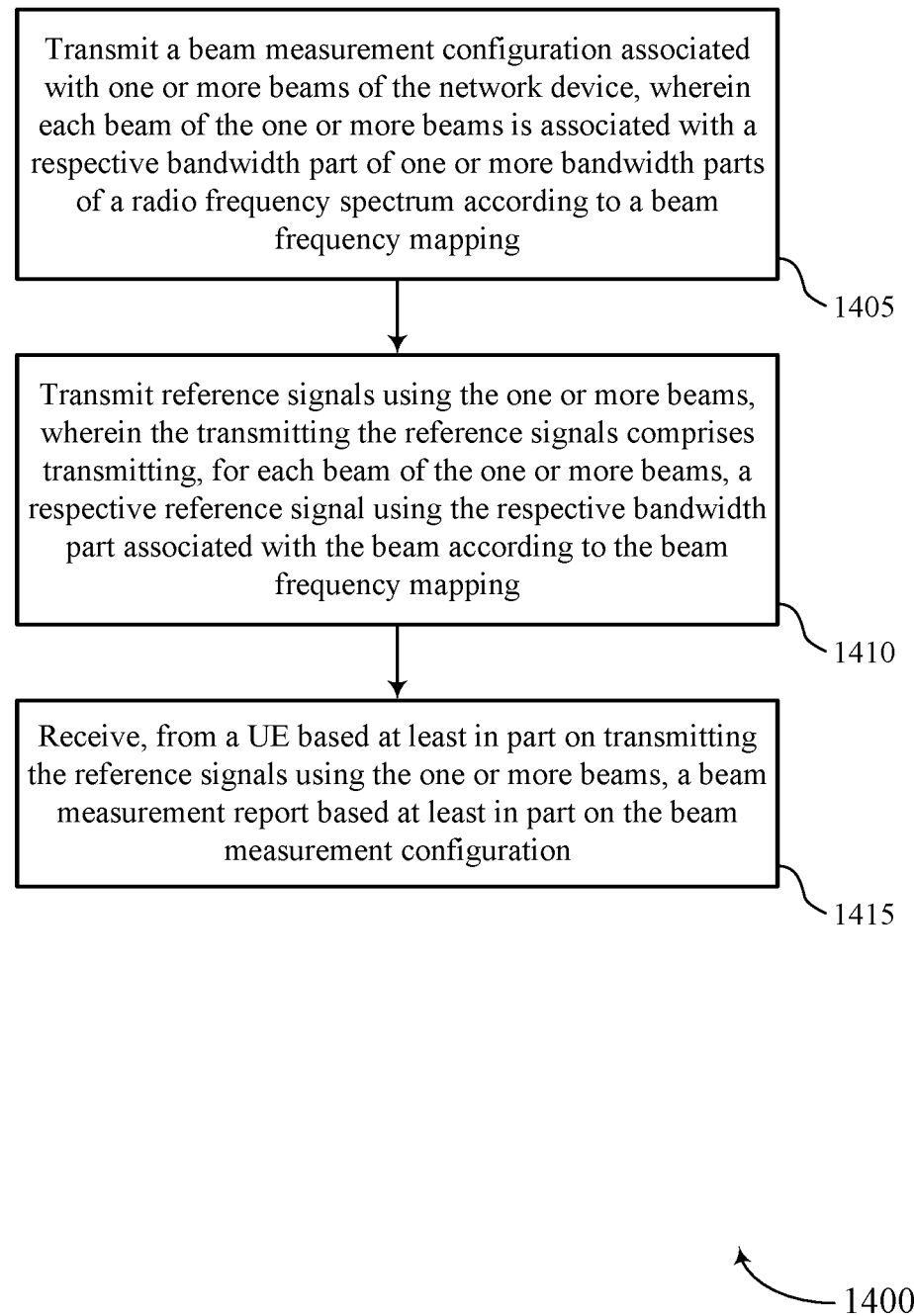

FIG. 14 shows a flowchart illustrating a method 1400 for beam measurement reporting in accordance with aspects of the present disclosure. The operations of method 1400 may be implemented by a network device, a device 805, a device 905, a device 1105, a satellite 120, a gateway 210, a combination of a satellite 120 and a gateway 210, or a base station 105, as described with reference to FIGS. 1 through 3 and 8 through 11. In some examples, such devices or systems may execute a set of instructions to control the functional elements of the device to perform the described functions. Additionally or alternatively, the base station may perform aspects of the described functions using special-purpose hardware.

At 1405, the method may include transmitting a beam measurement configuration associated with one or more beams of the network device, wherein each beam of the one or more beams is associated with a respective bandwidth part of one or more bandwidth parts of a radio frequency spectrum according to a beam frequency mapping. The operations of 1405 may be performed according to the methods described herein. In some examples, aspects of the operations of 1405 may be performed by a beam measurement configuration indication component 1025 as described with reference to FIG. 10.

At 1410, the method may include transmitting reference signals using the one or more beams, wherein the transmitting the reference signals comprises transmitting, for each beam of the one or more beams, a respective reference signal using the respective bandwidth part associated with the beam according to the beam frequency mapping. The operations of 1410 may be performed according to the methods described herein. In some examples, aspects of the operations of 1410 may be performed by a reference signal transmission component 1030 as described with reference to FIG. 10.

At 1415, the method may include receiving, from a UE based at least in part on transmitting the reference signals using the one or more beams, a beam measurement report based at least in part on the beam measurement configuration. The operations of 1415 may be performed according to the methods described herein. In some examples, aspects of the operations of 1415 may be performed by a beam measurement report reception component 1035 as described with reference to FIG. 10.

Figure 15:
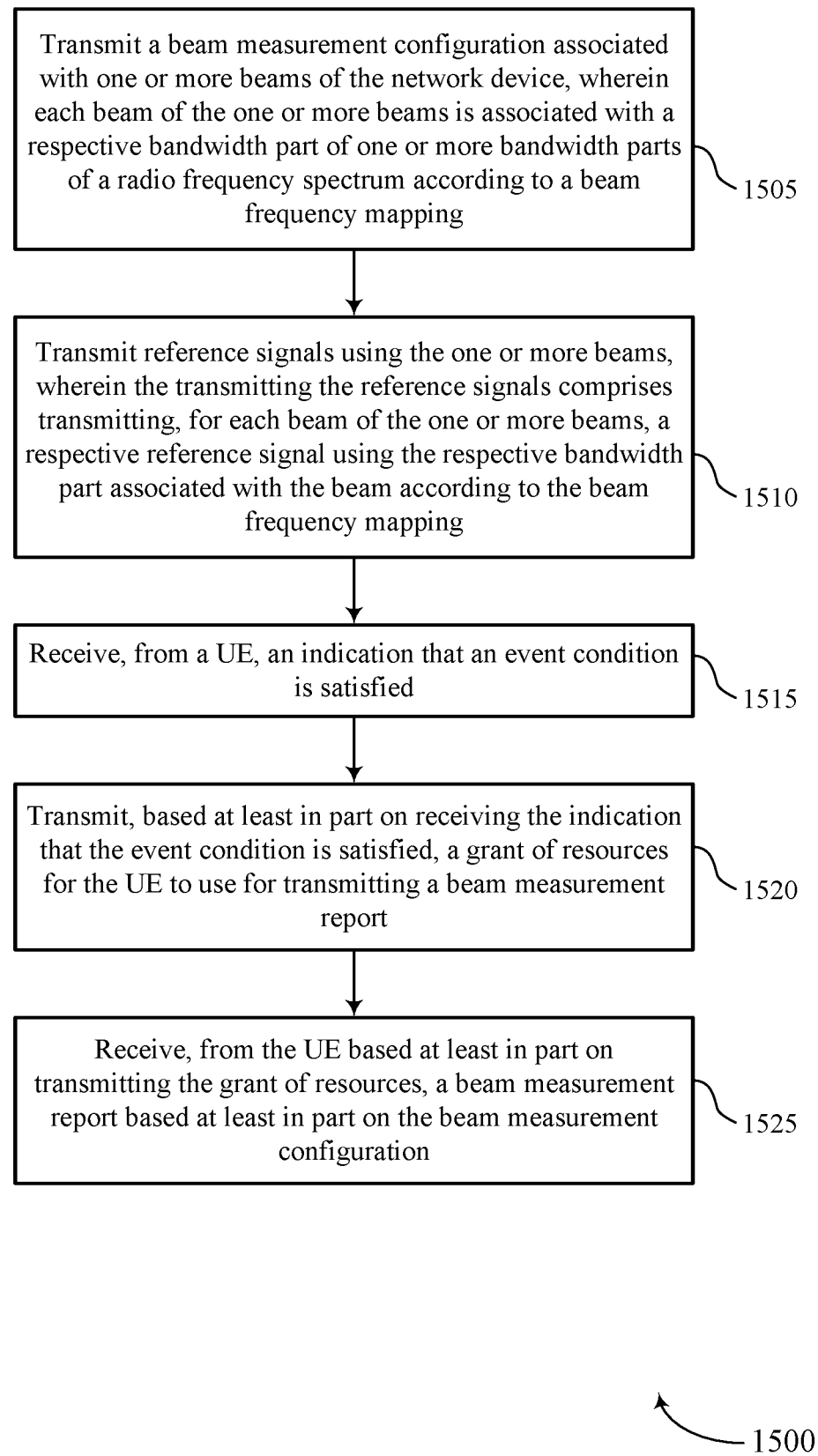

FIG. 15 shows a flowchart illustrating a method 1500 for beam measurement reporting in accordance with aspects of the present disclosure. The operations of method 1500 may be implemented by a network device, a device 805, a device 905, a device 1105, a satellite 120, a gateway 210, a combination of a satellite 120 and a gateway 210, or a base station 105, as described with reference to FIGS. 1 through 3 and 8 through 11. In some examples, such devices or systems may execute a set of instructions to control the functional elements of the device to perform the described functions. Additionally or alternatively, the base station may perform aspects of the described functions using special-purpose hardware.

At 1505, the method may include transmitting a beam measurement configuration associated with one or more beams of the network device, wherein each beam of the one or more beams is associated with a respective bandwidth part of one or more bandwidth parts of a radio frequency spectrum according to a beam frequency mapping. The operations of 1505 may be performed according to the methods described herein. In some examples, aspects of the operations of 1505 may be performed by a beam measurement configuration indication component 1025 as described with reference to FIG. 10.

At 1510, the method may include transmitting reference signals using the one or more beams, wherein the transmitting the reference signals comprises transmitting, for each beam of the one or more beams, a respective reference signal using the respective bandwidth part associated with the beam according to the beam frequency mapping. The operations of 1510 may be performed according to the methods described herein. In some examples, aspects of the operations of 1510 may be performed by a reference signal transmission component 1030 as described with reference to FIG. 10.

At 1515, the method may include receiving, from a UE, an indication that an event condition is satisfied. The operations of 1515 may be performed according to the methods described herein. In some examples, aspects of the operations of 1515 may be performed by a two-stage reporting component 1040 as described with reference to FIG. 10.

At 1520, the method may include transmitting, based at least in part on receiving the indication that the event condition is satisfied, a grant of resources for the UE to use for transmitting a beam measurement report. The operations of 1520 may be performed according to the methods described herein. In some examples, aspects of the operations of 1520 may be performed by a two-stage reporting component 1040 as described with reference to FIG. 10.

At 1525, the method may include receiving, from the UE based at least in part on transmitting the grant of resources, a beam measurement report based at least in part on the beam measurement configuration. The operations of 1525 may be performed according to the methods described herein. In some examples, aspects of the operations of 1525 may be performed by a beam measurement report reception component 1035 as described with reference to FIG. 10.

The following provides an overview of aspects of the present disclosure:

Aspect 1: A method for wireless communications at a UE, the method comprising: receiving a beam measurement configuration associated with one or more beams, wherein each beam of the one or more beams is associated with a respective bandwidth part of one or more bandwidth parts of a radio frequency spectrum according to a beam frequency mapping; monitoring, based at least in part on the beam measurement configuration, a first reference signal in a first bandwidth part of the one or more bandwidth parts that is associated with a first beam of the one or more beams according to the beam frequency mapping; determining a channel quality of the first beam based at least in part on the monitoring of the first reference signal in the first bandwidth part; determining that an event condition is satisfied based at least in part on the determining the channel quality of the first beam; and transmitting a beam measurement report based at least in part on the determining that the event condition is satisfied.

Aspect 2: The method of aspect 1, further comprising: monitoring, based at least in part on the beam measurement configuration, a second reference signal in a second bandwidth part of the one or more bandwidth parts that is associated with a second beam of the one or more beams according to the beam frequency mapping; and determining a channel quality of the second beam based at least in part on the monitoring the second reference signal, wherein the determining that the event condition is satisfied is based at least in part on the determining the channel quality of the second beam.

Aspect 3: The method of aspect 2, wherein the determining that the event condition is satisfied comprises: determining that a respective channel quality of each beam of a plurality of beams neighboring the first beam, including the second beam and included in the one or more beams, is greater than the channel quality of the first beam by at least a threshold amount.

Aspect 4: The method of aspect 3, further comprising: receiving a configuration to monitor a set of beams neighboring the first beam, the set of beams neighboring the first beam included in the one or more beams; monitoring, based at least in part on the configuration to monitor the set of beams neighboring the first beam, a respective reference signal in a respective bandwidth part that is associated with each beam of the set of beams neighboring the first beam according to the beam frequency mapping; and determining, based at least in part on monitoring the respective reference signals, a respective channel quality of each beam of the set of beams, wherein the determining that the respective channel quality of each beam of the plurality of beams neighboring the first beam is greater than the channel quality of the first beam by at least the threshold amount comprises determining that the channel quality of two or more beams of the set of beams neighboring the first beam is greater than the channel quality of the first beam by at least the threshold amount.

Aspect 5: The method of any of aspects 2 through 4, wherein the determining that the event condition is satisfied comprises: determining that the channel quality of the second beam is greater than the channel quality of the first beam by at least a threshold amount.

Aspect 6: The method of any of aspects 2 through 5, wherein the determining that the event condition is satisfied comprises: determining that the channel quality of the second beam is greater than a threshold channel quality.

Aspect 7: The method of any of aspects 2 through 6, wherein the determining that the event condition is satisfied comprises: determining that the channel quality of the first beam is less than a first threshold channel quality; and determining that the channel quality of the second beam is greater than a second threshold channel quality.

Aspect 8: The method of any of aspects 2 through 7, further comprising: determining that the channel quality of the first beam satisfies a threshold channel quality, wherein the monitoring the second reference signal is based at least in part on the channel quality of the first beam satisfying the threshold channel quality.

Aspect 9: The method of aspect 8, further comprising: determining the threshold channel quality based at least in part on receiving the beam measurement configuration, the threshold channel quality comprising a threshold RSRP, a threshold RSRQ, a SINR, or a combination thereof.

Aspect 10: The method of any of aspects 1 through 9, further comprising: determining a BLER associated with communications using the first beam, wherein the determining that the event condition is satisfied comprises determining that the BLER associated with the communications using the first beam is greater than a threshold BLER.

Aspect 11: The method of aspect 10, wherein the threshold BLER is lower than a BLER threshold associated with determining a radio link failure.

Aspect 12: The method of any of aspects 1 through 11, wherein the determining that the event condition is satisfied comprises: determining that the channel quality of the first beam is greater than a threshold channel quality.

Aspect 13: The method of any of aspects 1 through 12, wherein the determining that the event condition is satisfied comprises: determining that the channel quality of the first beam is less than a threshold channel quality.

Aspect 14: The method of any of aspects 1 through 13, further comprising: transmitting an indication that the event condition is satisfied; and receiving a grant of resources for the transmitting the beam measurement report.

Aspect 15: The method of any of aspects 1 through 14, wherein the transmitting the beam measurement report comprises: transmitting a radio resource control message, a MAC CE, or uplink control information that comprises the beam measurement report.

Aspect 16: The method of aspect 15, further comprising: generating the MAC control element for the beam measurement report; and transmitting a scheduling request, based at least in part on the generating the MAC CE, for requesting a transmission resource for transmitting the MAC CE, or for a retransmission of the MAC CE.

Aspect 17: The method of any of aspects 1 through 16, wherein the beam measurement report comprises a bitmap reporting whether each beam of a plurality of beams satisfies one or more event conditions.

Aspect 18: The method of any of aspects 1 through 17, wherein the receiving the beam measurement configuration comprises: receiving an indication of a plurality of event conditions for beam measurement reporting, or a plurality of signal quality measurements for beam measurement reporting, or a combination thereof.

Aspect 19: The method of any of aspects 1 through 18, further comprising: determining a channel quality threshold based at least in part on receiving the beam measurement configuration, the channel quality threshold comprising a threshold RSRP, a threshold RSRQ, a threshold SINR, or a combination thereof and determining that the event condition is satisfied based at least in part on determining the channel quality threshold.

Aspect 20: The method of any of aspects 1 through 19, wherein the receiving the beam measurement configuration comprises: receiving a first indication of a radio resource management configuration; and receiving a second indication indicating that the radio resource management configuration is to be applied for measuring the one or more beams.

Aspect 21: The method of any of aspects 1 through 20, further comprising: determining to include one or more channel quality indications in the beam measurement report based at least in part on a size of a communications resource available for transmitting the beam measurement report.

Aspect 22: The method of any of aspects 1 through 21, wherein the one or more beams are associated with a node of an NTN.

Aspect 23: A method for wireless communications at a network device, the method comprising: transmitting a beam measurement configuration associated with one or more beams of the network device, wherein each beam of the one or more beams is associated with a respective bandwidth part of one or more bandwidth parts of a radio frequency spectrum according to a beam frequency mapping; transmitting reference signals using the one or more beams, wherein the transmitting the reference signals comprises transmitting, for each beam of the one or more beams, a respective reference signal using the respective bandwidth part associated with the beam according to the beam frequency mapping; and receiving, from a UE based at least in part on transmitting the reference signals using the one or more beams, a beam measurement report based at least in part on the beam measurement configuration.

Aspect 24: The method of aspect 23, wherein the beam measurement configuration indicates an event condition for initiating beam measurement reporting by the UE.

Aspect 25: The method of aspect 24, wherein the transmitting the beam measurement configuration comprises: transmitting an indication for the UE to transmit the beam measurement report based at least in part on a respective channel quality of the plurality of beams being greater than a channel quality of a reference beam by at least a threshold amount.

Aspect 26: The method of aspect 25, further comprising: transmitting a configuration for the UE to monitor a set of beams neighboring the reference beam, the set of beams including the plurality of beams.

Aspect 27: The method of any of aspects 24 through 26, wherein the transmitting the beam measurement configuration comprises: transmitting an indication for the UE to transmit the beam measurement report based at least in part on a channel quality of a second beam being greater than a channel quality of a reference beam by at least a threshold amount.

Aspect 28: The method of any of aspects 24 through 27, wherein the transmitting the beam measurement configuration comprises: transmitting an indication for the UE to transmit the beam measurement report based at least in part on a channel quality of a second beam, different than a reference beam, being greater than a threshold channel quality.

Aspect 29: The method of any of aspects 24 through 28, wherein the transmitting the beam measurement configuration comprises: transmitting an indication for the UE to transmit the beam measurement report based at least in part on a channel quality of a first beam being less than a first threshold channel quality, and based at least in part on a channel quality of a second beam being greater than a second threshold channel quality.

Aspect 30: The method of any of aspects 24 through 29, wherein the transmitting the beam measurement configuration comprises: transmitting an indication for the UE to monitor a second reference signal associated with a second beam based at least in part on a channel quality of a first beam satisfying a threshold channel quality.

Aspect 31: The method of aspect 30, wherein the threshold channel quality comprises a threshold RSRP, a threshold RSRQ, a threshold SINR, or a combination thereof.

Aspect 32: The method of any of aspects 24 through 31, wherein the transmitting the beam measurement configuration comprises: transmitting an indication for the UE to transmit the beam measurement report based at least in part on a BLER associated with communications using a beam being greater than a threshold BLER.

Aspect 33: The method of aspect 32, wherein the threshold BLER is lower than a BLER threshold associated with determining a radio link failure.

Aspect 34: The method of any of aspects 24 through 33, wherein the transmitting the beam measurement configuration comprises: transmitting an indication for the UE to transmit the beam measurement report based at least in part on a channel quality of a reference beam being greater than a threshold channel quality.

Aspect 35: The method of any of aspects 24 through 34, wherein the transmitting the beam measurement configuration comprises: transmitting an indication for the UE to transmit the beam measurement report based at least in part on a channel quality of a reference beam being less than a threshold channel quality.

Aspect 36: The method of any of aspects 24 through 35, further comprising: receiving, from the UE, an indication that the event condition is satisfied; and transmitting, based at least in part on receiving the indication that the event condition is satisfied, a grant of resources for the UE to use for the transmitting the beam measurement report.

Aspect 37: The method of any of aspects 24 through 36, wherein the transmitting the beam measurement configuration comprises: transmitting an indication of a plurality of event conditions for beam measurement reporting, or a plurality of signal quality measurements for beam measurement reporting, or a combination thereof.

Aspect 38: The method of any of aspects 24 through 37, wherein the transmitting the beam measurement configuration comprises: transmitting an indication of a threshold channel quality associated with determining that the event condition is satisfied, the threshold channel quality comprising a threshold RSRP, a threshold RSRQ, a threshold SINR, or a combination thereof.

Aspect 39: The method of any of aspects 23 through 38, wherein the transmitting the beam measurement configuration comprises: transmitting a first indication of a radio resource management configuration; and transmitting a second indication indicating that the radio resource management configuration is to be applied for measuring the one or more beams each associated with the respective bandwidth part.

Aspect 40: The method of any of aspects 23 through 39, wherein the network device is a node of an NTN.

Aspect 41: An apparatus for wireless communications at a UE, comprising a processor; memory coupled with the processor; and instructions stored in the memory and operable, when executed by the processor, to cause the apparatus to perform a method of any of aspects 1 through 22.

Aspect 42: An apparatus for wireless communications at a UE, comprising at least one means for performing a method of any of aspects 1 through 22.

Aspect 43: A non-transitory computer-readable medium storing code for wireless communications at a UE, the code comprising instructions executable by a processor to perform a method of any of aspects 1 through 22.

Aspect 44: An apparatus for wireless communications at a network device, comprising a processor; memory coupled with the processor; and instructions stored in the memory and operable, when executed by the processor to cause the apparatus to perform a method of any of aspects 23 through 40.

Aspect 45: An apparatus for wireless communications at a network device, comprising at least one means for performing a method of any of aspects 23 through 40.

Aspect 46: A non-transitory computer-readable medium storing code for wireless communications at a network device, the code comprising instructions executable by a processor to perform a method of any of aspects 23 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
   at least one processor; and
   memory comprising instructions executable by the at least one processor to cause the apparatus to:
      receive a beam measurement configuration associated with one or more beams, wherein each beam of the one or more beams is associated with a respective bandwidth part of one or more bandwidth parts of a radio frequency spectrum according to a beam frequency mapping of a non-terrestrial network, and wherein the beam measurement configuration includes an indication of a plurality of event conditions to initiate beam measurement reporting in the non-terrestrial network;
      monitor, based at least in part on the beam measurement configuration, for a first reference signal in a first bandwidth part of the one or more bandwidth parts, the first bandwidth part being associated with a first beam of the one or more beams according to the beam frequency mapping; and
      provide, for transmission, a beam measurement report based at least in part on an event condition of the plurality of event conditions being satisfied, the satisfaction of the event condition being based at least in part on a channel quality associated with the first beam.

2. The apparatus of claim 1, wherein the instructions are further executable by the at least one processor to cause the apparatus to:
   monitor, based at least in part on the beam measurement configuration, a second reference signal in a second bandwidth part of the one or more bandwidth parts, the second bandwidth part being associated with a second beam of the one or more beams according to the beam frequency mapping, wherein the satisfaction of the event condition is based at least in part on a channel quality associated with the second beam.

3. The apparatus of claim 2, wherein the satisfaction of the event condition is based at least in part on a respective channel quality associated with each beam of a plurality of beams neighboring the first beam being greater than a channel quality associated with the first beam by at least a threshold amount, wherein the plurality of beams neighboring the first beam includes the second beam and are ones of the one or more beams.

4. The apparatus of claim 3, wherein the instructions are further executable by the at least one processor to cause the apparatus to:
   receive a configuration to monitor a set of beams neighboring the first beam, the set of beams neighboring the first beam included in the one or more beams; and
   monitor, based at least in part on the configuration to monitor the set of beams neighboring the first beam, a respective reference signal in a respective bandwidth part that is associated with each beam of the set of beams neighboring the first beam according to the beam frequency mapping, wherein the satisfaction of the event condition is based at least in part on the respective channel quality associated with two or more beams of the set of beams neighboring the first beam being greater than the channel quality associated with the first beam by at least the threshold amount.

5. The apparatus of claim 2, wherein the satisfaction of the event condition is based at least in part on the channel quality associated with the second beam being greater than the channel quality associated with the first beam by at least a threshold amount.

6. The apparatus of claim 2, wherein the satisfaction of the event condition is based at least in part on the channel quality associated with the second beam being greater than a threshold channel quality.

7. The apparatus of claim 2, wherein the satisfaction of the event condition is based at least in part on the channel quality associated with the first beam being less than a first threshold channel quality and the channel quality associated with the second beam being greater than a second threshold channel quality.

8. The apparatus of claim 2, wherein the instructions are further executable by the at least one processor to cause the apparatus to:
   monitor the second reference signal based at least in part on the channel quality associated with the first beam satisfying a threshold channel quality.

9. The apparatus of claim 8, wherein the threshold channel quality is based at least in part on the beam measurement configuration, the threshold channel quality comprising a threshold reference signal received power (RSRP), a threshold reference signal received quality (RSRQ), a threshold signal to interference and noise ratio (SINR), or a combination thereof.

10. The apparatus of claim 1, wherein the satisfaction of the event condition is based at least in part on a block error rate (BLER) associated with communications using the first beam being greater than a threshold BLER.

11. The apparatus of claim 10, wherein the threshold BLER is lower than a BLER threshold associated with determination of a radio link failure.

12. The apparatus of claim 1, wherein the satisfaction of the event condition is based at least in part on the channel quality associated with the first beam being greater than a threshold channel quality.

13. The apparatus of claim 1, wherein the satisfaction of the event condition is based at least in part on the channel quality associated with the first beam being less than a threshold channel quality.

14. The apparatus of claim 1, wherein the instructions are further executable by the at least one processor to cause the apparatus to:
   provide, for transmission, an indication of the satisfaction of the event condition; and
   receive a grant of resources for transmitting the beam measurement report based at least in part on transmitting the indication of the satisfaction of the event condition.

15. The apparatus of claim 1, wherein the beam measurement report is in a radio resource control message, a medium access control (MAC) control element, or uplink control information.

16. The apparatus of claim 15, wherein the instructions are further executable by the at least one processor to cause the apparatus to:
   generate the MAC control element for the beam measurement report; and
   provide, for transmission, a scheduling request based at least in part on generating the MAC control element for the beam measurement report, the scheduling request requesting a transmission resource for the MAC control element or for a retransmission of the MAC control element.

17. The apparatus of claim 1, wherein the beam measurement report comprises a bitmap reporting whether each beam of a plurality of beams satisfies one or more event conditions of the plurality of event conditions.

18. The apparatus of claim 1, wherein the instructions to receive the beam measurement configuration are executable by the at least one processor to cause the apparatus to:
receive an indication of a plurality of signal quality measurements for the beam measurement reporting.

19. The apparatus of claim 1, wherein the beam measurement configuration indicates a channel quality threshold, the channel quality threshold comprising a threshold reference signal received power (RSRP), a threshold reference signal received quality (RSRQ), a threshold signal to interference and noise ratio (SINR), or a combination thereof, and the satisfaction of the event condition is based at least in part on the indicated channel quality threshold.

20. The apparatus of claim 1, wherein the instructions to receive the beam measurement configuration are executable by the at least one processor to cause the apparatus to:
receive at least one of a first indication of a radio resource management configuration or a second indication indicating that the radio resource management configuration is to be applied for measuring the one or more beams.

21. The apparatus of claim 1, wherein one or more channel quality indications are included in the beam measurement report based at least in part on a size of a communications resource available for the beam measurement report.

22. The apparatus of claim 1, wherein the one or more beams are associated with a node of the non-terrestrial network.

23. An apparatus for wireless communications, comprising:
at least one processor; and
memory comprising instructions executable by the at least one processor to cause the apparatus to:
provide, for transmission, a beam measurement configuration associated with one or more beams, wherein each beam of the one or more beams is associated with a respective bandwidth part of one or more bandwidth parts of a radio frequency spectrum according to a beam frequency mapping of a non-terrestrial network, and wherein the beam measurement configuration includes an indication of a plurality of event conditions to initiate beam measurement reporting in the non-terrestrial network;
provide, for transmission, reference signals using the one or more beams, wherein the reference signals comprise, for each beam of the one or more beams, a respective reference signal for transmission using the respective bandwidth part associated with the each beam according to the beam frequency mapping; and
receive, based at least in part on transmitting the reference signals using the one or more beams and the respective bandwidth parts associated with the one or more beams, a beam measurement report based at least in part on the beam measurement configuration.

24. The apparatus of claim 23, wherein the beam measurement configuration comprises an indication to transmit the beam measurement report based at least in part on a respective channel quality associated with a plurality of beams being greater than a channel quality associated with a reference beam by at least a threshold amount.

25. The apparatus of claim 23, wherein the beam measurement configuration comprises an indication to transmit the beam measurement report based at least in part on a channel quality associated with a second beam being greater than a channel quality associated with a reference beam by at least a threshold amount.

26. The apparatus of claim 23, wherein the beam measurement configuration comprises an indication to transmit the beam measurement report based at least in part on a channel quality associated with a second beam, different than a reference beam, being greater than a threshold channel quality.

27. The apparatus of claim 23, wherein the beam measurement configuration comprises an indication to transmit the beam measurement report based at least in part on a channel quality associated with a first beam being less than a first threshold channel quality, and based at least in part on a channel quality associated with a second beam being greater than a second threshold channel quality.

28. A method for wireless communications at a user equipment (UE), the method comprising:
receiving a beam measurement configuration associated with one or more beams, wherein each beam of the one or more beams is associated with a respective bandwidth part of one or more bandwidth parts of a radio frequency spectrum according to a beam frequency mapping of a non-terrestrial network, and wherein the beam measurement configuration includes an indication of a plurality of event conditions to initiate beam measurement reporting in the non-terrestrial network;
monitoring, based at least in part on the beam measurement configuration, for a first reference signal in a first bandwidth part of the one or more bandwidth parts, the first bandwidth part being associated with a first beam of the one or more beams according to the beam frequency mapping; and
transmitting a beam measurement report based at least in part on an event condition being satisfied, and satisfaction of the event condition of the plurality of event conditions being based at least in part on a channel quality associated with the first beam.

29. A method for wireless communications at a network device, the method comprising:
transmitting a beam measurement configuration associated with one or more beams of the network device, wherein each beam of the one or more beams is associated with a respective bandwidth part of one or more bandwidth parts of a radio frequency spectrum according to a beam frequency mapping of a non-terrestrial network, and wherein the beam measurement configuration includes an indication of a plurality of event conditions to initiate beam measurement reporting in the non-terrestrial network;
transmitting reference signals using the one or more beams, wherein the transmitting the reference signals comprises transmitting, for each beam of the one or more beams, a respective reference signal using the respective bandwidth part associated with the each beam according to the beam frequency mapping; and
receiving, based at least in part on transmitting the reference signals using the one or more beams and respective bandwidth parts associated with the one or more beams, a beam measurement report based at least in part on the beam measurement configuration.

30. The apparatus of claim 1, further comprising a transceiver configured to transmit the beam measurement report, wherein:
  the beam measurement configuration is received via the transceiver; and
  the apparatus is configured as a user equipment (UE).

31. The apparatus of claim 23, further comprising a transceiver configured to transmit the beam measurement configuration and the reference signals, wherein:
  the beam measurement report is received via the transceiver; and
  the apparatus is configured as a network device.

\* \* \* \* \*